United States Patent
Barber et al.

(10) Patent No.: US 10,861,231 B2
(45) Date of Patent: *Dec. 8, 2020

(54) RENDERING IN COMPUTER GRAPHICS SYSTEMS

(71) Applicant: Imagination Technologies Limited, Kings Langley (GB)

(72) Inventors: Piers Barber, Kings Langley (GB); Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,062

(22) Filed: Aug. 13, 2019

(65) Prior Publication Data

US 2019/0362550 A1 Nov. 28, 2019

Related U.S. Application Data

(63) Continuation of application No. 16/252,612, filed on Jan. 19, 2019, now Pat. No. 10,424,114, which is a
(Continued)

(30) Foreign Application Priority Data

Mar. 14, 2013 (GB) .................................. 1304620.6

(51) Int. Cl.
*G06T 11/60* (2006.01)
*G06T 17/20* (2006.01)
(Continued)

(52) U.S. Cl.
CPC ................ *G06T 17/20* (2013.01); *G06T 3/20* (2013.01); *G06T 7/13* (2017.01); *G06T 11/40* (2013.01);
(Continued)

(58) Field of Classification Search
CPC .. G06T 17/20; G06T 7/13; G06T 3/20; G06T 11/40; G06T 15/80
See application file for complete search history.

(56) References Cited

U.S. PATENT DOCUMENTS

| 5,287,438 A | 2/1994 | Kelleher |
| 7,061,495 B1 | 6/2006 | Leather |

(Continued)

FOREIGN PATENT DOCUMENTS

| GB | 2479015 A | 9/2011 |
| WO | 02/077919 A2 | 10/2002 |

OTHER PUBLICATIONS

Doan, "Antialiased rendering of self-intersecting polygons using polygon decomposition," Proc. 12th Pacific Conference on Computer Graphics and Applications, Seoul, Korea, Oct. 6-8, 2004, pp. 383-391.
(Continued)

*Primary Examiner* — Sarah Lhymn
(74) *Attorney, Agent, or Firm* — Potomac Law Group, PLLC; Vincent M DeLuca

(57) ABSTRACT

A graphics system has a rendering space divided into a plurality of rectangular areas, each being sub-divided into a plurality of smaller rectangular areas of a plurality of pixels. Data is received representing a tiled set of polygons to be rendered in a selected one of the rectangular areas. For each polygon, a determination is made whether that polygon is located at least partially inside a selected one of the smaller rectangular areas in the selected rectangular area. If so, which pixels of the plurality of pixels in the selected smaller rectangular area are inside the polygon are identified. Or, if that polygon is not located at least partially inside the selected smaller rectangular area, no further processing of
(Continued)

the polygon is performed at one or more of the plurality of pixels in the smaller rectangular area.

17 Claims, 13 Drawing Sheets

Related U.S. Application Data continuation of application No. 15/475,468, filed on Mar. 31, 2017, now Pat. No. 10,235,802, which is a continuation of application No. 14/205,907, filed on Mar. 12, 2014, now abandoned.

(51) Int. Cl.
  *G06T 11/40* (2006.01)
  *G06T 7/13* (2017.01)
  *G06T 3/20* (2006.01)
  *G06T 15/80* (2011.01)

(52) U.S. Cl.
  CPC .... *G06T 15/80* (2013.01); *G06T 2207/10028* (2013.01); *G06T 2207/20016* (2013.01); *G06T 2207/20021* (2013.01)

(56) References Cited

U.S. PATENT DOCUMENTS

| | | |
|---|---|---|
| 7,834,872 B2 | 11/2010 | Fenney et al. |
| 8,152,613 B2 | 4/2012 | Williams et al. |
| 8,743,117 B2 | 6/2014 | Redshaw |
| 2004/0130552 A1* | 7/2004 | Duluk, Jr. ............... G06T 15/50 345/506 |
| 2004/0246251 A1 | 12/2004 | Fenney et al. |
| 2011/0227921 A1 | 9/2011 | Redshaw |
| 2013/0120380 A1 | 5/2013 | Kallio |

OTHER PUBLICATIONS

Greene, "Hierarchical Polygon Tiling with Coverage Masks," International Conference on Computer Graphics and Interactive Techniques, 1996, pp. 65-76.

Sun et al., "Universal Rasterizer With Edge Equations and Tile-Scan Triangle Traversal Algorithm for Graphics Processing Units", Multimedia and Expo, 2009. ICME 2009, IEEE (pp. 1358-1361) Jun. 2009.

* cited by examiner

RENDERING IN COMPUTER GRAPHICS SYSTEMS

BACKGROUND

Computer graphics systems generally comprise a geometry processing unit which receives data defining the geometry to be rendered and converts this to a set of graphics primitives (also referred to as polygons), typically triangles, which are used when rendering the image. The surfaces of each object are sub-divided into these graphics primitives. Each triangular primitive is defined by a set of vertices which, in turn, defines the planar surface and the extent of that surface.

There are two main families of computer graphics systems: tile-based systems and immediate mode systems.

In tile-based rendering systems, the display or framebuffer is conceptually subdivided into a plurality of rectangular areas, known as "tiles", each corresponding to a (usually) predetermined number of pixels (e.g. 32*32). For each tile, an object list is compiled which references or contains (at least) the primitives in the image which intersect, or potentially intersect, that tile. This process is sometimes referred to as "tiling" or "binning". Thus, tiles do not need to process the objects which do not intersect them. A tiling unit is often used to improve the speed of creating the per-tile lists.

In immediate mode renderers, although scanline-order processing of primitives is frequently employed, some systems instead opt to divide the screen into tiles of pixels. The rendering of each primitive is done on a tile by tile basis, with each pixel in a tile being processed before progressing to the next tile. The rendering order is chosen to improve locality of memory references e.g. the texture fetches. Note that, with immediate mode renderers, no per-tile lists are created and each primitive appears to be rendered immediately—although, due to pipelining and parallelism, there may, of course, be a number of primitives being processed simultaneously.

During the rendering of the pixels (in either tile-based or immediate mode rendering systems), a graphics system will usually determine which pixels an object intersects (also known as scan conversion) and which object is visible at each pixel using depth testing to find the closest object to a view point. Texturing and shading data can then be applied to the pixel. Where objects are transparent, data from a frontmost object and from objects behind it may be required to properly texture and shade a pixel.

SUMMARY

A rendering technique for a computer graphics system is described in which each rectangular area (tile) is divided into smaller rectangular areas (microtiles), each comprising a plurality of pixels. During rendering of a tile, for each polygon associated with that tile, a coarse grain evaluation is used to identify the set of microtiles covered, wholly or partially, by the polygon. Those microtiles may be referred to as the active microtiles. For each active microtile (and only those microtiles), scan conversion and other rasterization processes, such as depth processing, are then applied to the pixels in that microtile. The microtiles in the active set can be processed in any order, or even in parallel given sufficient resources.

According to a first aspect, there is provided a method of rendering in a graphics system having a rendering space divided into a plurality of rectangular areas and having each rectangular area sub-divided into a plurality of smaller rectangular areas each comprising a plurality of pixels, the method comprising: receiving data representing a tiled set of polygons to be rendered in a selected one of the rectangular areas; for each polygon in the tiled set, determining whether that polygon is located at least partially inside a selected one of the smaller rectangular areas in the selected rectangular area; and if that polygon is located at least partially inside the selected smaller rectangular area, determining which of the plurality of pixels in the selected smaller rectangular area are inside the polygon, or if that polygon is not located at least partially inside the selected smaller rectangular area, performing no further processing of the polygon at one or more of the plurality of pixels in the smaller rectangular area.

Thus, the method first identifies which smaller rectangular areas (microtiles) are intersected by the polygon (i.e. fall at least partially inside the polygon), and then only processes those identified smaller rectangular areas. Thus, the smaller rectangular areas identified are the active microtiles. By performing the initial identification at microtile scale, which is a relatively coarse grain evaluation, subsequent processing costs can be reduced. Relatively inexpensive low precision calculations may be used to initially identify those smaller rectangular areas which are intersected by the polygon. Small polygons in a large rectangular area (tile) may be dealt with efficiently; in a tile-based renderer, using larger tiles reduces the cost of the tiling and binning process. Polygons with extreme aspect ratios, such as line polygons, may be dealt with more efficiently. Smaller rectangular areas (microtiles) may be processed in any order, which allows implementation of load balancing schemes in subsequent processing steps.

The size, number and shape of the rectangular areas and the smaller rectangular areas may be selected as desired. The size of the smaller rectangular areas may be determined by the amount of computing or silicon resources available in a single clock cycle for the step of determining which of the plurality of pixels in the selected smaller rectangular area are inside the polygon. Choosing smaller rectangular areas that are square, or nearly square, will typically result in the highest utilisation of the parallel pixel units used to evaluate a smaller rectangular area. By using smaller rectangular areas having a square aspect ratio, there will be relatively little disparity between processing of polygons with extreme aspect ratios at different angles of orientation.

In one example, a rectangular area (tile) of 32*32 pixels may be subdivided into 64 4*4 smaller rectangular areas (microtiles). For example, computing resources may be available to process one 4*4 microtile per clock cycle. Therefore, in this example, a polygon covering the entire 32*32 tile would be processed in 64 clock cycles, but a small polygon covering only one microtile would be processed in only 1 clock cycle.

In one example, the method further comprises: receiving a plurality of image polygons to be rendered in the rendering space; and tiling the image polygons to generate the tiled set of polygons by determining at least those image polygons that are located within the selected rectangular area.

In one example, determining whether the polygon is located at least partially inside the selected smaller rectangular area comprises: providing a plurality of sample points for each rectangular area, the number of sample points in a rectangular area being equal to the number of smaller rectangular areas in the rectangular area and each sample point being located in a respective smaller rectangular area; and identifying the sample points falling inside the polygon. In that example, in order for a sample point identified as falling inside the polygon to correspond to its smaller rectangular area falling at least partially inside the polygon, an edge of the polygon and/or the sample point may be adjusted. For example, an edge of the polygon and/or the sample point may be translated. The translation may be dependent on the location of the sample point in the smaller rectangular area and the orientation of the edge.

Determining whether the polygon is located at least partially inside the selected smaller rectangular area may comprise: deriving a plurality of edges from the polygon; and comparing each of the plurality of edges with a sample point associated with the selected smaller rectangular area to determine whether the selected smaller rectangular area is located wholly outside any of the edges; wherein if the selected smaller rectangular area is not located wholly outside any of the edges then the polygon is determined to be located at least partially inside the selected smaller rectangular area.

Typical systems render convex polygons. If the sampling point for a smaller rectangular area falls inside all edges of a convex polygon (for example, inside all three edges for a triangular polygon), we can conclude that the smaller rectangular area falls wholly or partially within the polygon. The edge equation for each polygon edge is computed from vertex data defining the vertices of the polygon. The sample points provide a low resolution grid which may be used for the coarse grain evaluation to identify the active smaller rectangular areas (microtiles). The location of each sample point in its respective smaller rectangular area may be selected as desired. However, all sample points are located in the same position in the respective smaller rectangular areas, thereby providing a regularly spaced grid of sample points. For example, each sample point may be located at the top left corner of its smaller rectangular area.

In an example, comparing each of the plurality of edges comprises: processing each of the plurality of edges to derive a plurality of processed edges, wherein the processing comprises, for each edge, determining an orientation of the respective edge and applying a translation to the respective edge in accordance with the orientation; and comparing each of the plurality of processed edges with the sample point.

The translation ensures that, if the sample point is found to fall inside the edge, at least a part of the selected smaller rectangular area falls inside the edge, and if the sample point is found to fall outside the edge, the entire selected smaller rectangular area falls outside the edge. This avoids the possibility that the sample point is found to fall outside the edge, but part of the selected smaller rectangular area actually falls inside the edge. This may occur for certain sample point locations within the selected smaller rectangular area and certain edge orientations. Thus, the translation may be dependent on the location of the sample point in the selected smaller rectangular area and the orientation of the edge. The translation may be zero in some cases.

Applying the translation to the respective edge in accordance with the orientation may comprise: applying a translation to the respective edge in one dimension, applying a translation to the respective edge in two dimensions, or applying no translation to the respective edge.

Each processed edge may be represented by a respective edge equation, and comparing each of the plurality of processed edges with the sample point may comprise evaluating the respective edge equation at the sample point and determining whether the evaluation exceeds a predetermined threshold.

It is possible to use the evaluation to determine whether the smaller rectangular area or the sample point falls inside or outside the edge because the edge equations have direction around the polygon. Determining simply whether the evaluation exceeds a predetermined threshold is a relatively simple calculation—more straightforward than evaluating the actual value. The predetermined threshold may be zero, in which case, the determining determines whether the evaluation is positive or negative.

The method may further comprise using the determination of whether the evaluation exceeds a predetermined threshold to determine whether the sample point is located inside or outside the processed edge.

Typically, the edge equations are directed in a clockwise direction around the polygon. Thus, in that example, if the processed edge equation evaluated at the sample point is positive, the smaller rectangular area with which that sample point is associated is identified as falling inside the edge from which the processed edge was derived and, if the processed edge equation evaluated at the sample point is negative, the smaller rectangular area with which that sample point is associated is identified as falling outside the edge from which the processed edge was derived. If the processed edge equation evaluated at the sample point is zero, the sample point falls exactly on the edge from which the processed edge was derived. For simplicity in this coarse grain evaluation (i.e. the initial identification of which smaller rectangular areas fall at least partially inside the polygon), the rectangular area with which that sample point is associated may be treated as inside the polygon edge. The edge equation for each polygon edge may be equivalent to data defining a surface perpendicular to a viewpoint and facing towards the polygon.

In one example, if the sample point is located inside the processed edge, then the smaller rectangular area, with which the sample point is associated, is located at least partially inside the edge from which the processed edge was derived, and if the sample point is located outside the processed edge, then the smaller rectangular area, with which the sample point is associated, is located wholly outside the edge from which the processed edge was derived.

Each edge equation may be of the form $E(x,y)=Ax+By+C$, where A, B and C are constants specific to the processed edge, and determining whether the evaluation exceeds a predetermined threshold may comprise comparing $-Ax$ with $By+C$.

The edge equation $E(x,y)=Ax+By+C$ for each polygon edge is computed from vertex data defining the vertices of the polygon. x and y represent a screen location, a pixel location or a subpixel location. Constant C may be adjusted so that the scene origin is at the location of the top left sample point. This increases efficiency of the processing, because the magnitude of the x and y values is smaller.

The method may further comprise outputting a first value if $By+C>-Ax$ and outputting a second value if $By+C<-Ax$, one of the first value and the second value indicating that the sample point is located inside the processed edge and the other of the first value and the second value indicating that the sample point is located outside the processed edge.

Thus, a single output value can indicate whether the sample point is located inside or outside the processed edge. Hence, it can be determined whether the selected smaller rectangular area is located wholly outside the edge. If the output bits for all edges of the polygon indicate that the smaller rectangular area falls inside (or partially inside) all edges, that rectangular area can be identified as a smaller rectangular area which falls at least partially inside the polygon.

In one example, if $By+C=-Ax$ (i.e. if the sample point falls exactly on the processed edge), the value which indicates that the sample point falls inside the processed edge may be output. That is, in this coarse grain evaluation, it may be sufficient to treat sample points falling exactly on an edge as inside that edge. However, in an alternative example, a tie-breaking rule may be applied.

Comparing $-Ax$ with $By+C$ for each processed edge for all sample points in a rectangular area may be performed using a plurality of comparators, each comparator associated with one sample point and one smaller rectangular area in the rectangular area. Thus, the number of comparators is equal to the number of sample points and smaller rectangular areas in the rectangular area. Such a plurality of comparators may be referred to as an array of comparators. For example, if a rectangular area (tile) of 32*32 pixels is subdivided into 64 4*4 smaller rectangular areas (microtiles), 64 comparators (8*8) may be provided. Such an array or plurality may be provided for each polygon edge. For example, if the polygons are triangles (which is typically the case), three arrays of comparators may be provided. Alternatively, the same array of comparators may be used sequentially for each edge.

Comparing $-Ax$ with $By+C$ for the processed edge may comprise reducing the precision of "$By+C$" and comparing "$-Ax$" with the reduced precision "$By+C$". By reducing the precision of the $By+C$ expression, before comparing it with the $-Ax$ expression, the cost of the comparison may be reduced. Since a comparison must be made for each processed edge against each sample point, a large total number of comparisons need to be made. Thus, any (even small) cost reduction in each individual comparison may significantly reduce the total cost.

According to a first example, the step of, for each polygon in the tiled set, determining whether that polygon is located at least partially inside a selected one of the smaller rectangular areas in the selected rectangular area, is performed for all smaller rectangular areas in the rectangular area in parallel for each edge of the polygon.

The comparison for all smaller rectangular areas in a given rectangular area may be performed in a single step. In this example, if an edge equation is provided to define each polygon edge, the edge equation is compared with all sample points (i.e. all smaller rectangular areas) in the rectangular area in parallel. If each edge equation is of the form $E(x,y)=Ax+By+C$, $-Ax$ may be compared with $By+C$ for all sample points in parallel.

The comparisons for all the polygon edges may be performed sequentially or in parallel.

According to a second example, the step of, for each polygon in the tiled set, determining whether that polygon is located at least partially inside a selected one of the smaller rectangular areas in the selected rectangular area, is performed in a plurality of serial steps, each serial step comprising identifying the smaller rectangular areas, of a subset of the smaller rectangular areas in the rectangular area, falling at least partially inside the polygon.

Each subset may comprise a row or column of microtiles within the tile. That is, each serial step identifies which microtile in that row or column falls at least partially inside the polygon. The number of serial steps will depend on the total number of microtiles in the tile and the number of microtiles in each subset. For example, if a rectangular area (tile) of 32*32 pixels is subdivided into 64 4*4 smaller rectangular areas (microtiles), each serial step may identify which microtile in each 8 microtile row or column falls at least partially inside the polygon, and 8 serial steps will be required for the total 64 evaluations.

In this example, if an edge equation is provided to define each polygon edge, the edge equation may be compared with the sample points in the subset of the smaller rectangular areas in parallel, then the edge equation may be compared with the sample points in the next subset of the smaller rectangular areas in parallel, and so on until all the sample points are evaluated. If each edge equation is of the form $E(x,y)=Ax+By+C$, $-Ax$ may be compared with $By+C$ for all sample points in a subset in parallel, then $-Ax$ may be compared with $By+C$ for all sample points in the next subset, and so on.

The comparisons for all the polygon edges may be performed sequentially or in parallel.

In one example, each rectangular area is sub-divided into a plurality of intermediate rectangular areas, each intermediate rectangular area comprising a plurality of the smaller rectangular areas, and wherein determining for each polygon in the tiled set, whether that polygon is located at least partially inside the selected one of the smaller rectangular areas comprises: determining whether that polygon is located at least partially inside a selected one of the intermediate rectangular areas in the selected rectangular area, the selected intermediate rectangular area including the selected smaller rectangular area; and if so, determining whether that polygon is located at least partially inside the selected one of the smaller rectangular areas, or if not, determining that that polygon is not located at least partially inside the selected smaller rectangular area.

That is, an additional level of hierarchy may be used to first divide each rectangular area (tile) into intermediate rectangular areas ("minitiles"). Each minitile in the tile may then be evaluated in turn, to identify the active microtiles within that minitile. One example uses 64*64 pixel tiles, a 16*16 pixel intermediate minitile, and a 4*4 microtile.

In one example, the method further comprises rasterizing those pixels in the selected smaller rectangular area that are determined to be inside the polygon.

According to a second aspect, there is provided a graphics system having a rendering space divided into a plurality of rectangular areas and having each rectangular area subdivided into a plurality of smaller rectangular areas each comprising a plurality of pixels, the graphics system comprising a processing unit configured to: receive data representing a tiled set of polygons to be rendered in a selected one of the rectangular areas; and determine, for each polygon in the tiled set, whether that polygon is located at least partially inside a selected one of the smaller rectangular areas in the selected rectangular area, wherein, if that polygon is located at least partially inside the selected smaller rectangular area, the processing unit is arranged to determine which of the plurality of pixels in the selected smaller rectangular area are inside the polygon, and if that polygon is not located at least partially inside the selected smaller rectangular area, the processing unit is arranged to perform no further processing of the polygon at one or more of the plurality of pixels in the smaller rectangular area.

Thus, the graphics system is arranged to identify which smaller rectangular areas (microtiles) are intersected by the polygon (i.e. fall at least partially inside the polygon), and to then only process those identified smaller rectangular areas. Thus, the identified smaller rectangular areas are the active microtiles. By performing the initial identification at microtile scale, which is a relatively coarse grain evaluation, subsequent processing costs can be reduced.

In an example, the processing unit is further configured to: receive a plurality of image polygons to be rendered in the rendering space; and tile the image polygons to generate the tiled set of polygons by determining at least those image polygons that are located within the selected rectangular area.

In an example, a plurality of sample points is provided for each rectangular area, the number of sample points in a rectangular area being equal to the number of smaller rectangular areas in the rectangular area and each sample point being located in a respective smaller rectangular area; and the processing unit is configured to determine, for each polygon in the tiled set, whether that polygon is located at least partially inside a selected one of the smaller rectangular areas in the selected rectangular area by identifying the sample points falling inside the polygon. The sample points provide a low resolution grid which may be used for the coarse grain evaluation to identify the active microtiles.

The processing unit may be configured to determine whether the polygon is located at least partially inside the selected smaller rectangular area by: deriving a plurality of edges from the polygon; and comparing each of the plurality of edges with a sample point associated with the selected smaller rectangular area to determine whether the selected smaller rectangular area is located wholly outside any of the edges; wherein if the selected smaller rectangular area is not located wholly outside any of the edges then the polygon is determined to be located at least partially inside the selected smaller rectangular area.

The processing unit may be configured to compare each of the plurality of edges by: processing each of the plurality of edges to derive a plurality of processed edges, wherein the processing comprises, for each edge, determining an orientation of the respective edge and applying a translation to the respective edge in accordance with the orientation; comparing each of the plurality of processed edges with the sample point.

The processing unit may be configured to apply the translation to the respective edge in accordance with the orientation by: applying a translation to the respective edge in one dimension, applying a translation to the respective edge in two dimensions, or applying no translation to the respective edge.

Each processed edge may be represented by a respective edge equation and the processing unit is configured to compare each of the plurality of processed edges with the sample point by evaluating the respective edge equation at the sample point and determining whether the evaluation exceeds a predetermined threshold.

The processing unit may be configured to use the determination of whether the evaluation exceeds a predetermined threshold to determine whether the sample point is located inside or outside the processed edge.

In one example, if the processed edge equation evaluated at the sample point is positive, the smaller rectangular area with which that sample point is associated is identified as falling inside the edge from which the processed edge was derived and, if the processed edge equation evaluated at the sample point is negative, the smaller rectangular area with which that sample point is associated is identified as falling outside the edge from which the processed edge was derived.

In one example, if the sample point is located inside the processed edge, then the smaller rectangular area, with which the sample point is associated, is located at least partially inside the edge from which the processed edge was derived, and if the sample point is located outside the processed edge, then the smaller rectangular area, with which the sample point is associated, is located wholly outside the edge from which the processed edge was derived.

Each edge equation may be of the form $E(x,y)=Ax+By+C$, where A, B and C are constants specific to the processed edge, and the processing unit may be configured to determine whether the evaluation exceeds a predetermined threshold by comparing $-Ax$ with $By+C$.

The processing unit may be configured to output a first value if $By+C>-Ax$ and output a second value if $By+C<-Ax$, one of the first value and the second value indicating that the sample point is located inside the processed edge and the other of the first value and the second value indicating that the sample point is located outside the processed edge.

The graphics system may comprise a plurality of comparators for comparing $-Ax$ with $By+C$ for each processed edge for all sample points in a rectangular area, each comparator associated with one sample point and one smaller rectangular area in the rectangular area.

Comparing $-Ax$ with $By+C$ for the processed edge may comprise reducing the precision of "$By+C$" and comparing "$-Ax$" with the reduced precision "$By+C$". This reduces the cost of the comparison.

In a first example, the processing unit is configured to determine, for each polygon in the tiled set, whether that polygon is located at least partially inside a selected one of the smaller rectangular areas in the selected rectangular area, for all smaller rectangular areas in the rectangular area in parallel for each edge of the polygon. The comparisons for all the polygon edges may be performed sequentially or in parallel.

In a second example, the processing unit is configured to determine, for each polygon in the tiled set, whether that polygon is located at least partially inside a selected one of the smaller rectangular areas in the selected rectangular area, in a plurality of serial steps, each serial step comprising identifying the smaller rectangular areas, of a subset of the smaller rectangular areas in the rectangular area, falling at least partially inside the polygon. The comparisons for all the polygon edges may be performed sequentially or in parallel.

In one example, each rectangular area is sub-divided into a plurality of intermediate rectangular areas, each intermediate rectangular area comprising a plurality of the smaller rectangular areas, and the processing unit is configured to determine, for each polygon in the tiled set, whether that polygon is located at least partially inside the selected one of the smaller rectangular areas by: determining whether that polygon is located at least partially inside a selected one of the intermediate rectangular areas in the selected rectangular area, the selected intermediate rectangular area including the selected smaller rectangular area; and if so, determining whether that polygon is located at least partially inside the selected one of the smaller rectangular areas, or if not, determining that that polygon is not located at least partially inside the selected smaller rectangular area.

That is, an additional level of hierarchy may be used to first divide each rectangular area (tile) into intermediate rectangular areas ("minitiles"). Separate hardware units may be provided for each hierarchical level or the evaluation at the different hierarchical levels may make use of the same hardware unit.

In one example, the graphics system further comprises a rasterizing unit for rasterizing those pixels in the selected smaller rectangular area that are determined to be inside the polygon.

According to a third aspect, there is provided a graphics processing unit configured to render to a rendering space divided into a plurality of rectangular areas, each rectangular area being sub-divided into a plurality of smaller rectangular areas each comprising a plurality of pixels, the graphics processing unit comprising: an interface to a memory device; a microtiling unit arranged to receive via the interface data representing a tiled set of polygons to be rendered in a selected one of the rectangular areas, determine for each smaller rectangular area in the selected rectangular area whether that smaller rectangular area contains at least a portion of a selected polygon, and output a corresponding indication; and a scan converter configured to receive the indications, and if a selected one of the smaller rectangular areas contains at least a portion of the selected polygon, determine which of the plurality of pixels in the respective smaller rectangular area are inside the selected polygon, and if a selected one of the smaller rectangular areas does not contain at least a portion of the selected polygon, perform no further processing of the selected polygon at one or more of the plurality of pixels in the respective smaller rectangular area.

The graphics processing unit may further comprise: a tiling unit configured to receive a plurality of image polygons to be rendered in the rendering space, tile the image polygons to generate the tiled set of polygons by determining at least those image polygons that are located at least partially within the selected rectangular area, and output the tiled set of polygons to the memory device.

The microtiling unit may comprise edge calculation logic configured to receive the selected polygon and derive a plurality of edge equation parameters for each edge of the selected polygon.

The microtiling unit may further comprise edge processing logic coupled to the edge calculation logic and configured to: receive the plurality of edge equation parameters for a selected edge of the selected polygon; determine an orientation of the selected edge and apply a translation to the edge equation parameters in accordance with the orientation to generate processed edge equation parameters, wherein the translation corresponds to a shift of the selected edge in one dimension, two dimensions, or no shift of the selected edge; and output the processed edge equation parameters.

The edge processing logic may comprise a quadrant determination unit arranged to determine the orientation of the selected edge of the polygon by evaluating the signs of one or more of the edge equation parameters.

The microtiling unit may comprise: a comparison unit configured to receive the processed edge equation parameters and evaluate the processed edge equation parameters for each smaller rectangular area to determine which of the smaller rectangular areas are located wholly outside the selected edge of the polygon, and which are located at least partially inside the selected edge of the polygon.

The comparison unit may be further configured to: perform the determination of which of the smaller rectangular areas are located wholly outside the selected edge of the polygon, and which are located at least partially inside the selected edge of the polygon for each edge of the selected polygon; and generate the indication such that any of the smaller rectangular areas that are not located wholly outside at least one edge of the selected polygon are indicated as containing at least a portion of a selected polygon.

The comparison unit may comprise: one or more evaluation units configured to receive the processed edge equation parameters and generate a first value from the processed edge equation parameters for each of the smaller rectangular areas in dependence on its position in the rectangular area, and a second value from the processed edge equation parameters for each of the smaller rectangular areas in dependence on its position in the rectangular area.

The comparison unit may further comprise: a clamping unit configured to receive the first value and generate a reduced first value by reducing the precision of the first value in dependence on the number of bits used to represent the second value.

The comparison unit may further comprise: a comparator array comprising a plurality of comparators each associated with at least one of the smaller rectangular areas and configured to operate in parallel, each comparator configured to compare the first value or the reduced first value with the second value for its respective smaller rectangular area to determine whether that smaller rectangular area is located wholly outside the selected edge of the polygon or located at least partially inside the selected edge of the polygon.

According to a fourth aspect, there is provided an apparatus for rendering in a graphics system having a rendering space divided into a plurality of rectangular areas and having each rectangular area sub-divided into a plurality of smaller rectangular areas each comprising a plurality of pixels, the apparatus comprising: means for receiving data representing a tiled set of polygons to be rendered in a selected one of the rectangular areas; and means for determining, for each polygon in the tiled set, whether that polygon is located at least partially inside a selected one of the smaller rectangular areas in the selected rectangular area; wherein the apparatus is arranged, if that polygon is located at least partially inside the selected smaller rectangular area, to determine which of the plurality of pixels in the selected smaller rectangular area are inside the polygon, and if that polygon is not located at least partially inside the selected smaller rectangular area, to perform no further processing of the polygon at one or more of the plurality of pixels in the smaller rectangular area.

According to another aspect, there is further provided a computer readable storage medium having encoded thereon computer readable program code for generating the graphics processing unit of the third aspect.

According to another aspect, there is further provided a computer readable storage medium having encoded thereon computer readable program code for generating a processing unit configured to perform the method of the first aspect.

Features described herein in relation to the method may also be applicable to the system or apparatus, and features described in relation to the system or apparatus may also be applicable to the method.

BRIEF DESCRIPTION OF THE DRAWINGS

Examples will now be described in detail with reference to the accompanying drawings in which.

DETAILED DESCRIPTION

Figure 1:
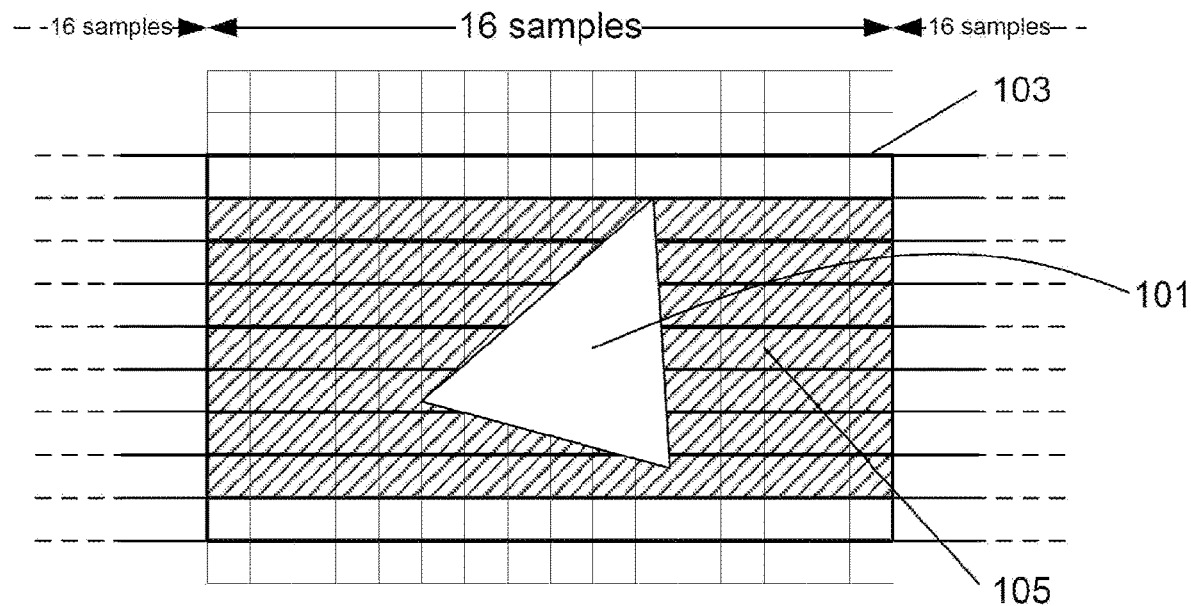
FIG. 1 shows a prior art arrangement of a parallel row sampling approach with a small triangle.

In recent years, as computer graphics models have become more complex, there has generally been a reduction in the average size of triangles. FIG. 1 shows an example of a prior art sampling approach used with a small triangle 101. Referring to FIG. 1, assume that a typical, on screen triangle is of the order of 18 pixels in area, so the width and height are each approximately 6 pixels. If an example renderer is working in parallel on row sets 103 of 16 pixels, (even if it is restricted to only considering those row sets that intersect the triangle, of which there are seven (shown shaded, 105) in FIG. 1), then only approximately 16% of the pixels in each row set 105 will be found to be inside the triangle. This low level of utilisation (the proportion of processed pixels that a triangle intersects) is undesirable.

Figure 2:
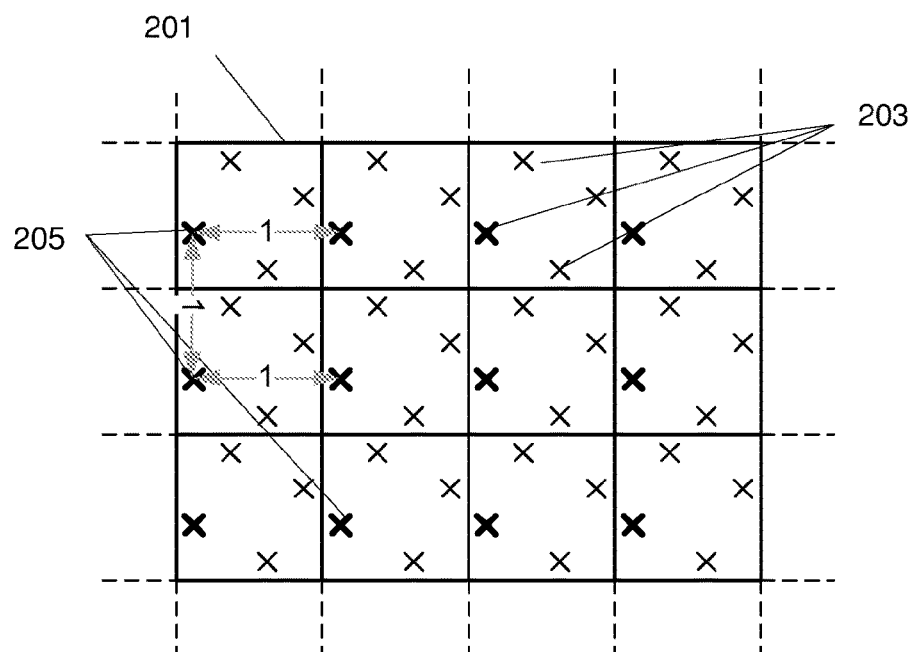
FIG. 2 shows a prior art system that is performing 4× anti-aliasing of image data.

Aliasing is a well-known problem in computer graphics which stems from sampling a signal at below the Nyquist limit. This is often apparent when only one sample point is taken per pixel. Pragmatic solutions, such as supersampling or multisampling, which involve taking several samples per pixel, and subsequently filtering, are often used in the art. This may be considered equivalent to initially rendering at a higher pixel resolution. It should be noted, therefore, that in this specification, the term "sample" and the term "pixel" may be used interchangeably. FIG. 2 shows a prior art system that is performing 4× anti-aliasing of image data, in which a 3*4 subset 201 of the image pixels is shown. "Within" each pixel are defined four sampling locations 203: the same pattern of locations is used in each pixel. This means that there are sets of "related" sample locations 205 separated, in the x- and y-directions by regular 1 pixel widths/heights. This can further exacerbate the low level of utilisation.

One way to counteract the low utilisation is to reduce the tile size. However, there is a trade-off associated with the tiling/binning process and the chosen tile size. Smaller tiles (or at least smaller granularity in the binning process), typically result in more efficient rendering due to a higher ratio of pixels being covered by each tested primitive. However, for a given image dimension, smaller tiles imply a larger number of tiles and hence a greater number of object lists that need to be stored and managed.

The method and apparatus described herein provides a technique for increasing the utilisation without incurring the storage and management costs of reducing the tile size. As described below, this technique divides each rectangular area (tile) into smaller rectangular areas (microtiles). The technique first identifies which smaller rectangular areas (microtiles) are intersected by a polygon (i.e. fall at least partially inside the polygon), and then only processes those identified smaller rectangular areas. Thus, the identified smaller rectangular areas are the active microtiles. By performing the initial identification at microtile scale, which is a relatively coarse grain evaluation, subsequent processing costs can be reduced. Throughout this specification, the term "rectangular area" is used interchangeably with the term "tile", the term "smaller rectangular area" is used interchangeably with the term "microtile" and the term "primitive" is used interchangeably with the term "polygon". Note that the term "rectangular" is intended to encompass square.

Figure 3:
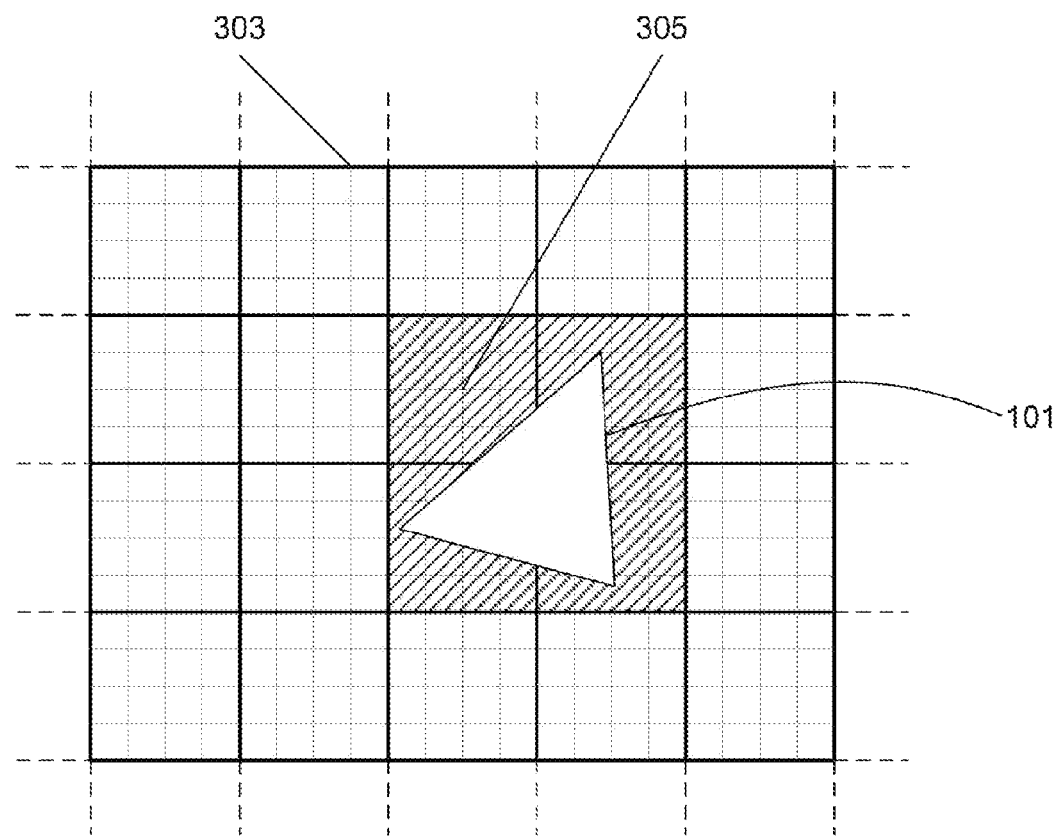
FIG. 3 shows the triangle of FIG. 1 against the microtiles of an example.

FIG. 3 shows the triangle 101 of FIG. 1 against 20 4*4 pixel microtiles 303. The microtiles which are intersected by triangle 101 (the active microtiles 305) are shown shaded in FIG. 3. The utilisation level for the FIG. 1 example rendering method, was only approximately 16%, as noted above. However, using the method described herein, the utilisation level (the proportion of pixels within active microtiles 305 which triangle 101 intersects) would, typically, nearly double, to approximately 30%.

Figure 4:
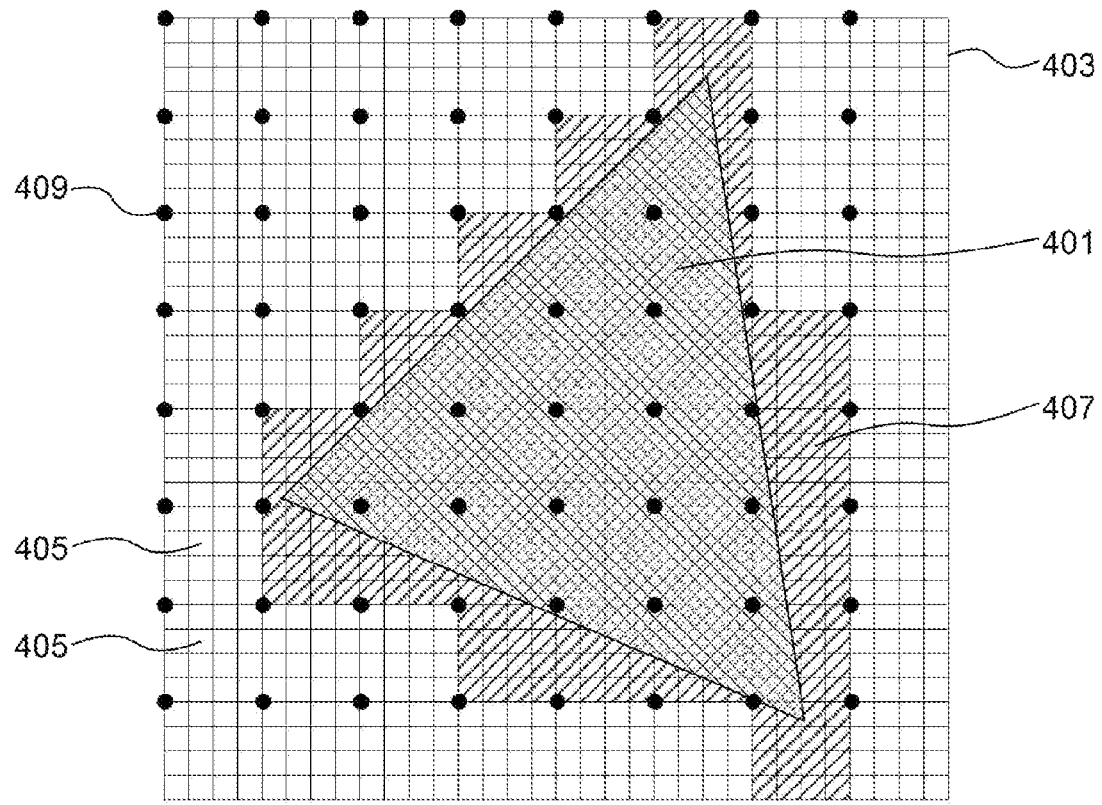
FIG. 4 shows a larger triangle against the microtiles of an example.

FIG. 4 shows a larger triangle 401 in a 32*32 pixel tile 403 including 64 4*4 microtiles 405. The intersected microtiles 407 are shaded in FIG. 4. In this example, sample points 409 are provided at the top left hand corner of each microtile. Only those microtiles which are active are processed for the triangle shown in FIG. 4, and no further processing is required for the other microtiles. Thus, microtiles that intersect the triangular polygon are first identified and then those which are intersected are processed. As a result of this, the following can be achieved:

Relatively inexpensive low precision calculations can be used to initially identify active microtiles (microtiles that fall at least partially within a polygon).

Small polygons can be dealt with efficiently within a proportionately large tile. In a tile-based renderer, being able to use larger tiles reduces the cost of the tiling/binning process.

Polygons with extreme aspect ratios, such as line polygons, can be dealt with efficiently.

It is possible to extend the method and system to handle multi sample anti-aliasing on all edges.

There is a reduction in the number of wasted calculations relative to non-square processing footprints.

Microtiles can be processed in any order thereby allowing implementation of load balancing schemes in subsequent processing.

Flexibility is provided in being able to process microtiles independently of an associated polygon.

The method and apparatus, which leads to the above features, will now be described.

Figure 16:
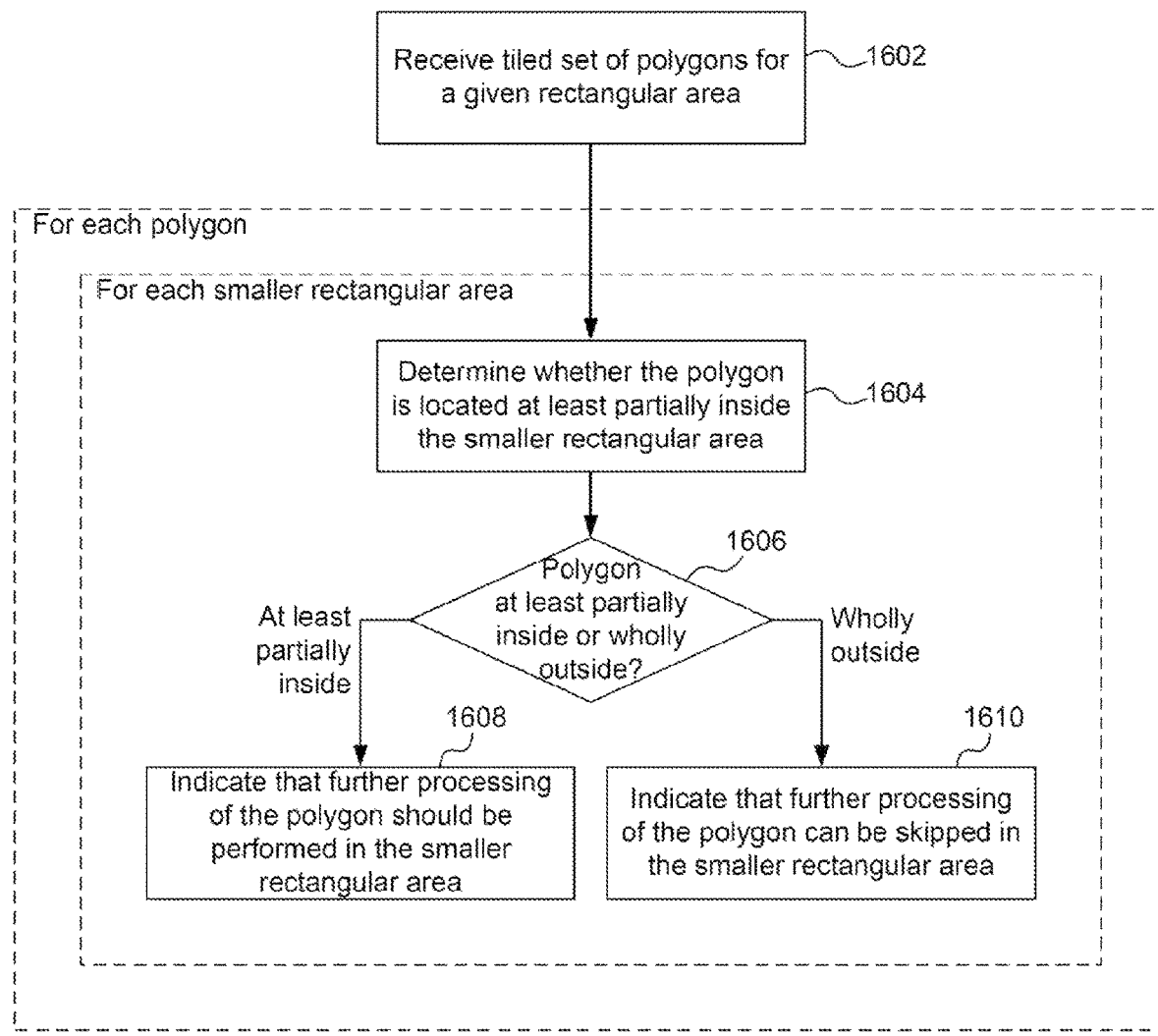
FIG. 16 shows a flowchart of a method for reducing processing using microtiles.

FIG. 16 illustrates a flowchart of an overall method for reducing processing and increasing the utilisation level using microtiles. In step 1602 a set of polygons are received in connection with a selected one of the tiles (rectangular area). This set of polygons represents those polygons of an image that have been determined to be present in the selected tile. Therefore, the set of polygons corresponds to the object list for the tile, as generated by the tiling/binning process, and is referred to as a tiled set of polygons. The tiled set of polygons may be in the form of a list of references to parameters of the polygons, or may contain the polygon parameters.

Each polygon in the tiled set is then evaluated in connection with each microtile (smaller rectangular area) as shown in step 1604. For example, a polygon is selected from the tiled set, and then evaluated in connection with a selected microtile. This can be repeated for each microtile, and then another polygon selected and the overall process repeated. In alternative examples, this can be reversed, such that a microtile is selected, and then each polygon evaluated for that microtile before selecting another microtile.

For a selected polygon and a selected microtile, in step 1604 it is determined whether the selected polygon is located at least partially inside (i.e. not wholly outside) the selected microtile. If, in step 1606, the selected polygon is found to be located at least partially inside the selected microtile, then in step 1608 an indication is generated that further processing of that polygon should be performed in the microtile. In other words, because it has been determined that the polygon is present in that microtile, then additional rendering operations should continue to be performed for that polygon in that microtile. This includes scan conversion operations to determine which of the pixels in that microtile are inside the polygon, and may further include, for example, depth testing, or any other rasterisation functions.

Conversely, if in step 1606 the selected polygon is found to be located wholly outside the selected microtile, then in step 1610 it is indicated that further processing of the polygon can be skipped in that microtile. In other words, because the polygon is not present within the microtile, then the pixels within that microtile will not be covered by the polygon. This means that additional rendering operations in connection with the polygon can be avoided for the pixels in that microtile, as that polygon will have no influence upon them.

Figure 17:
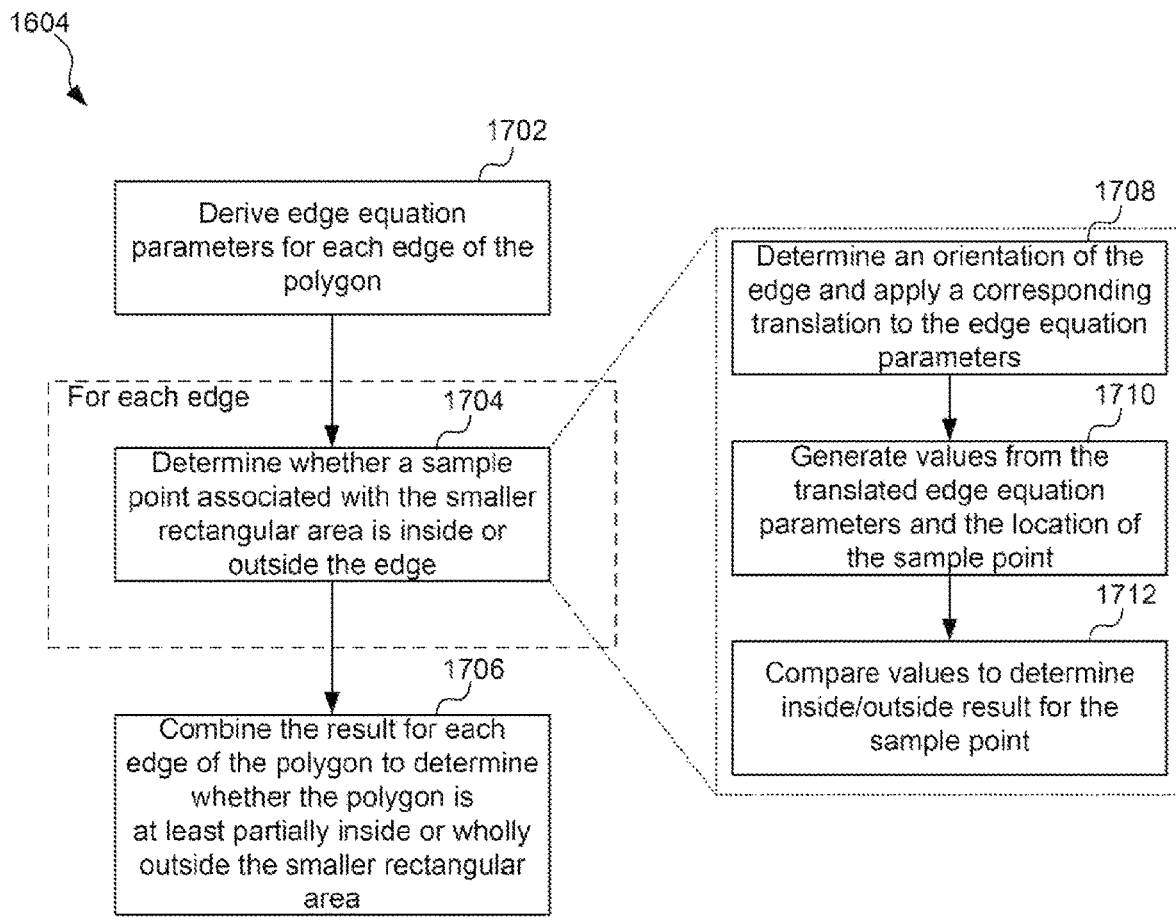
FIG. 17 shows a flowchart of a method for determining whether a polygon is located at least partially inside a microtile.

Reference is now made to FIG. 17, which illustrates a more detailed flowchart of an example process for determining whether a polygon is located at least partially inside a microtile (i.e. a more detailed flowchart of operations performed by step 1604). In step 1702, edge equation parameters are derived for each edge of the selected polygon. Example edge equations are discussed in more detail below. Then, for each edge, a determination is made in step 1704 whether a sample point associated with the microtile is inside or outside the edge. Once an inside/outside result is known for all edges of the polygon, then these can be combined in step 1706 to determine whether the overall polygon is either partially inside or wholly outside the microtile.

FIG. 17 also shows an example process for determining whether a sample point associated with the microtile is inside or outside the edge in step 1704. An orientation for the edge is determined in step 1708, as described in detail below, and a corresponding translation applied to the edge equation parameters in dependence on the orientation. This translation enables the result obtained for the sample point of the microtile to apply to the microtile as a whole. First and second values are then generated in step 1710 using the translated edge equation parameters and the location of the sample point of the microtile within the tile. The first and second values are compared in step 1712 to provide the determination of whether the sample point is inside or outside the edge. Details on the generation of the first and second values and their comparison are provided below.

Figure 18:
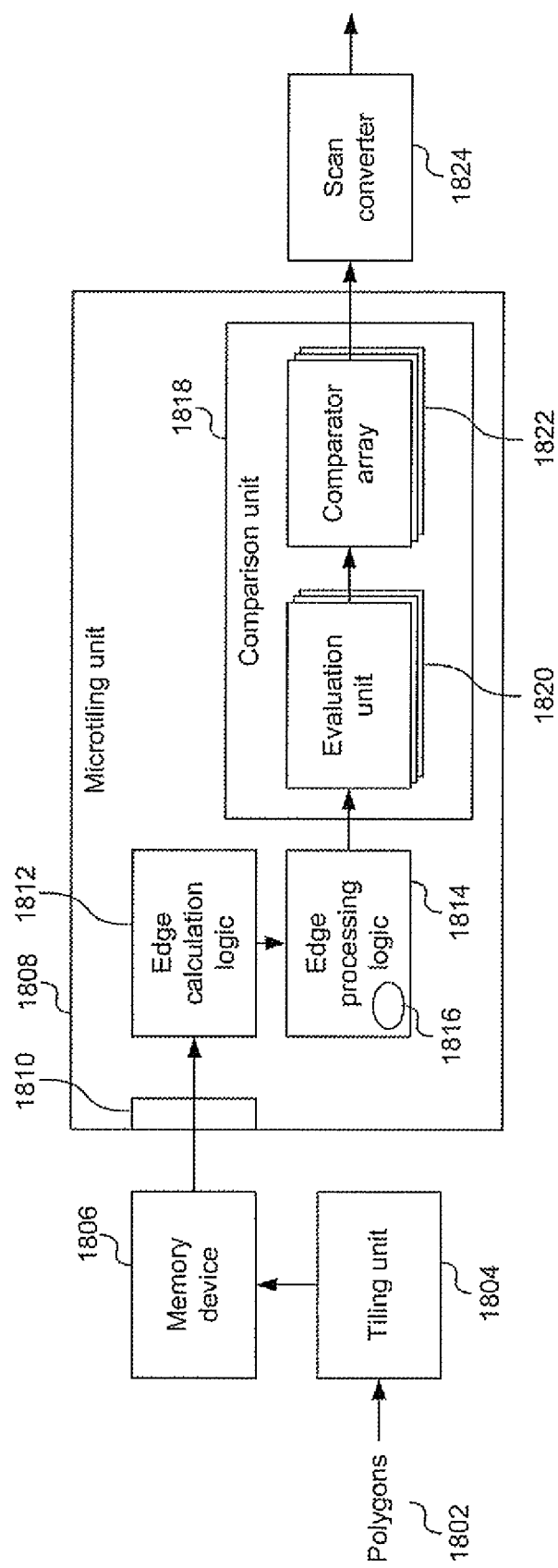
FIG. 18 shows a block diagram of an example graphics processing system for implementing the method.

FIG. 18 illustrates a block diagram of an example graphics processing system for implementing the above-described method. The graphics processing system receives polygons 1802 for an image, and a tiling unit 1804 processes these polygons to perform tiling/binning, and determine which polygons are within which tiles. The outputs of the tiling unit 1804 are tiled polygon sets (object lists) for each tile. These are output to a memory device 1806.

A microtiling unit 1808 is arranged to perform the operations described in FIGS. 16 and 17 above. The microtiling unit 1808 receives the tiled polygon set for a given tile from the memory device 1806 via an interface 1810. A selected polygon from the tiled polygon set is provided to edge calculation logic 1812, which derives the edge equation parameters for each edge. Edge processing logic 1814 is coupled to the edge calculation logic 1812 and receives the edge equation parameters. The edge processing logic 1814 determines the orientation of each edge and applies the appropriate translation. The edge processing logic 1814 may comprise quadrant determination logic 1816 for determining the edge orientation.

The processed edge equation parameters for the polygon are provided to a comparison unit 1818 coupled to the edge processing logic 1814. The comparison unit 1818 determines whether the selected polygon is either partially inside or wholly outside each microtile in the given tile. The comparison unit 1818 comprises one or more evaluation units 1820 that receive the processed edge equation parameters and calculate the first and second values based on the processed edge equation parameters and the location of each sample point in each the microtile. One or more comparator arrays 1822 are arranged to receive the first and second values, and compare them to determine whether the selected polygon is either partially inside or wholly outside each microtile. This result can be output from the comparison unit 1818 in the form of an indication of which microtiles should be subject to further processing in connection with the selected polygon, and provided to a scan converter 1824, for example.

In one example, the evaluation units 1820 can be structured to perform operations in parallel, for example calculating the first and second values in parallel and/or calculating values for multiple edges in parallel (e.g. three edges if the polygon is a triangle). In alternative examples, there may be fewer evaluation units 1820, e.g. one that serially calculates the first and second values for each edge. Similarly, the comparator arrays 1822 can also be structured to operate in a parallel manner in one example. For example, there can be one comparator for each microtile in the comparator array 1822, and the comparators operate in parallel to perform the comparison for each microtile concurrently. In an alternative example, one comparator can perform the comparison for a plurality of microtiles, taking each in turn (e.g. one comparator for each row or column of microtiles). In addition or alternatively, there can be a comparator array for each edge to enable all edges of the polygon to be compared in parallel (e.g. three comparator arrays if the polygon is a triangle).

More detail on the above elements is now provided below.

Polygon Edge Equations

Polygons used in graphic systems are typically triangles. When these reach the rendering stage of a graphics system they can be defined by three edge equations and a depth equation. The examples described here evaluate each edge equation at all points on a fixed grid of sample positions. In an example, the edge equations are each of the form $E(x,y)=Ax+By+C$, where x and y represent either a screen location, a pixel location or, in the case of supersample anti-aliasing, a subpixel location.

A, B and C may be pre-calculated fixed point precision constant coefficients specific to the polygon edge. A, B, and C are usually generated from triangle vertex coordinates that themselves (for reasons of guaranteeing mathematical stability) are represented by fixed-point coordinates of bounded range. Thus, the number of bits in each coefficient can be known precisely.

To reduce the cost of evaluation within a tile, C may be pre-adjusted such that the scene origin is translated to the sample location of the top-left pixel in the tile. This makes processing more efficient because it reduces the range and magnitude of the x and y values which, in turn, reduces the size of the mathematical operations needed to evaluate the edge equations. Such a translation can be performed directly on the vertex coordinates, prior to computation of each edge's A, B and C coefficients, or applied to the C value after the calculations on the original coordinates.

The primitive edges can be considered to be vectors and have a direction (e.g. clockwise) around the primitive. Thus, in this clockwise example, if a location is to the right of the edge, it can be considered to be inside the edge, but if a location is to the left of the edge, it can be considered to be outside the edge. Therefore, if the edge vectors are directed in a clockwise fashion around the polygon, given any x and y values within the tile being processed, if $E(x,y)$ is positive (greater than zero), then the sample point (x,y) is inside the edge being evaluated; if $E(x,y)$ is negative (less than zero), then the sample point (x,y) is outside the edge being evaluated; and if $E(x,y)$ is zero, then the sample point lies precisely on the edge E. For detailed rasterization, the case where $E(x,y)$ is zero must be handled by a tie breaking rule (for example, the OpenGL "fill rule"). The coarse grain evaluation (i.e. the initial identification of which microtiles fall at least partially inside the polygon), however, may instead opt to use a conservative, slightly cheaper alternative of assuming that the sample point is inside the edge. In order for a sample point to lie within a polygon, it must be inside all of the edges.

The above description applies, directly, to the per-pixel (or per-subpixel) inside tests required for subsequent detailed rasterization. However, in one example, in order to perform the coarse grain evaluation (i.e. the initial identification of which microtiles fall at least partially inside the polygon), each edge equation, $E(x,y)$, must be adjusted. In summary, if any sample location in the microtile is inside the edge, then the corresponding sample point must also indicate "inside" when evaluated against the adjusted edge equation. Conversely, if the sample point indicates "outside" then all sample locations in the microtile must be outside the edge. The adjustment is equivalent to translating the edge. More specifically, the C coefficient of each equation is adjusted to give C' according to the orientation of the edge. The orientation, in turn, is specified by the edge's A and B coefficients. A summary of this process is given below.

Edge Translations

As discussed above, in order to perform inside tests that apply to a microtile of pixels using this coarse grain evaluation (i.e. the initial identification of which areas fall at least partially inside the polygon), each edge equation $E(x,y)$, should be adjusted to become $E'(x,y)$. Each primitive edge may need to be translated, depending on orientation, by the width and/or height of the microtile.

Figure 5:
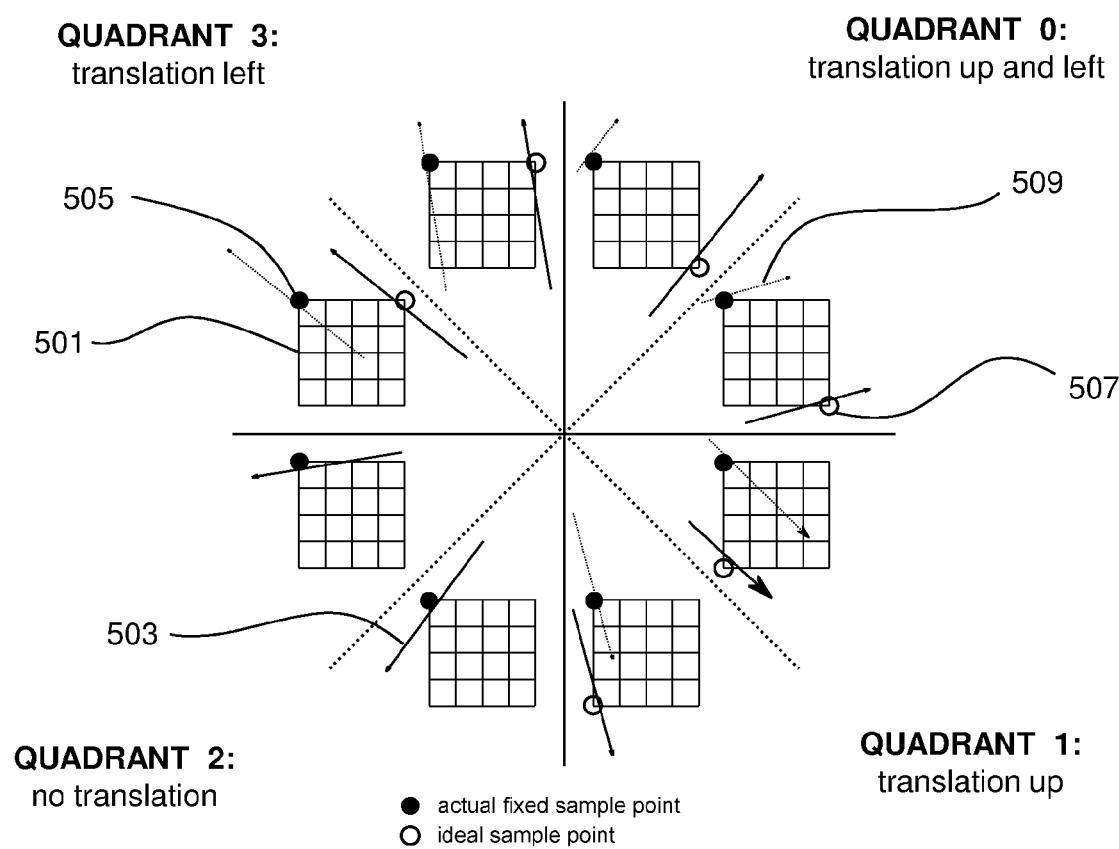
FIG. 5 shows classifications of edge orientation versus edge translation for coarse grain evaluation.

FIG. 5 shows translation operations for various polygon edge orientations for the initial identification of which microtiles fall at least partially inside the polygon, for the illustrative example of when the microtile sample point for each microtile is at the top left corner of the microtile. The chosen microtile size may be such that the translation of each edge is inexpensive. In the example illustrated in FIG. 5, eight illustrative 4*4 sample microtiles 501 are shown each intersecting with a respective edge 503. The orientation of each edge 503 is such that it only glances the microtile 501. Actual fixed sample points (solid circles 505) are shown at the top left corner of each microtile, and ideal sample points (empty circles 507) are also shown. The ideal sample points are the points that enable a determination of whether the microtile as a whole is inside or outside the particular edge. The ideal sample point changes depending on the orientation of the edge as shown in FIG. 5. The relative positions of the actual sample point 505 and the ideal sample point 507 determine the appropriate translation of an edge. The translated edges are shown in dotted lines at 509. In the example illustrated in FIG. 5, where a 4*4 sample microtile is employed, the translation in the x and y directions, $t_x$ and $t_y$, will each be either 0 or 4 samples. Adjustment of coefficient C to give C' is then simply a matter of subtracting 4A or 4B or both, or leaving C unchanged.

As shown in FIG. 5, the decision whether to translate the edge vector, and in which direction, is dependent on its slope or orientation. This is easily determined from the signs of the A and B coefficients:

Quadrant 0: B negative, A positive.
Quadrant 1: B positive, A positive.
Quadrant 2: B positive, A negative.
Quadrant 3: B negative, A negative.

The required edge translations therefore become:

Quadrant 0: $C'=C-(A.t_x+B.t_y)$=translation up and left.
Quadrant 1: $C'=C-A.t_x$=translation up.
Quadrant 2: $C'=C$=no translation.
Quadrant 3: $C'=C-B.t_y$=translation left.

The evaluation of each sample point on the coarse microtile grid only has to return the sign bit of the processed edge equation with the appropriate translation applied $E'(x,y)$ and not the actual value. The outcome of the evaluation is then a Boolean indicating whether any part of the microtile is inside the processed edge $E'(x,y)$.

The processed edge $E'(x,y)=Ax+By+C'$, so it can be seen that $By+C' \geq -Ax$ is: TRUE for $E'(x,y) \geq 0$
and FALSE for $E(x,y)<0$.

Thus, if $By+C' \geq -Ax$ is TRUE, the sample point (x,y) is inside the edge being evaluated or precisely on the edge being evaluated (which can be treated as inside the edge in this coarse grain evaluation); and if $By+C' \geq -Ax$ is FALSE, the sample point (x,y) is outside the edge being evaluated. In this example, such a magnitude comparison is used, since this is less costly than an extra add and a compare against zero that would be required if $E'(x,y)$ were fully evaluated.

By selecting a microtile size that is a power of two in sample width and height, the full coarse sample grid for the tile becomes simple to calculate. For example on a 32*32 sample tile with 4*4 sample microtiles the Ax terms are:

0, −4A, −8A, −12A, −16A, −20A, −24A, −28A (x=0.28 in increments of 4).

Calculation of these eight values and their negation is computationally inexpensive. Similarly the eight By+C' terms are also inexpensive:

C', 4B+C', 8B+C', 12B+C', 16B+C', 20B+C', 24B+C', 28B+C' (y=0.28 in increments of 4).

It will be appreciated that common terms can be shared, where appropriate, amongst these evaluations.

Comparators

Figure 6:
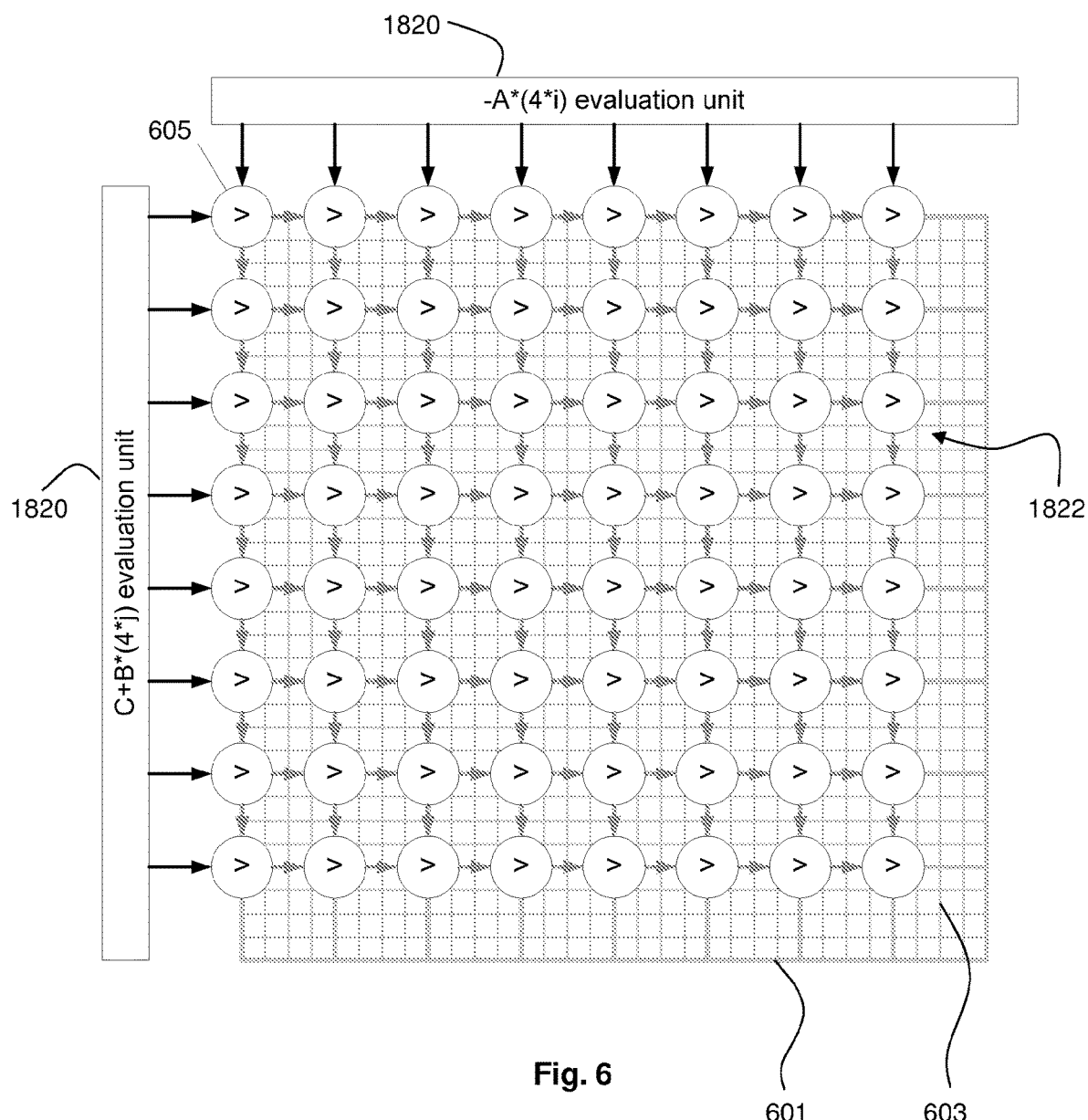
FIG. 6 shows a first example for determining which microtiles are inside a given edge, using an array of compare units.

FIG. 6 shows a first example for determining which microtiles are inside a given edge, using a comparison of By+C' and −Ax. Given Nx*Ny microtiles in a tile, the set of Nx, −Ax terms, and the set of Ny, By+C' terms can be computed by one or more evaluation units (1820 in FIG. 18) and compared using an Nx*Ny grid of comparators (comparator array 1822 from FIG. 18). FIG. 6 illustrates this arrangement for an example with a 32*32 sample tile 601 and 4*4 sample microtiles 603. The example of FIG. 6 therefore requires a grid of 8*8 comparators 605 to undertake the coarse grain evaluation for an edge on all microtiles in parallel. Note that virtually the same scheme can be used for the inside tests for the rasterization step.

To support triangular polygons, a one example would have three such units, one for each of the three triangle edges. An alternative example might reuse a smaller number of units over several clock cycles. An example that supports wide line segments (i.e. parallelograms) may have four of these units, and similarly for other many sided polygons.

Further Reducing the Cost for Comparisons

Although the above is relatively inexpensive, the cost of the coarse grain evaluation may be further reduced.

As already noted, the input vertex coordinates of a polygon are generally represented by fixed-point values. These can be considered to be expressed as a multiple of the pixel dimensions plus some number of bits of sub-pixel precision. Therefore, each x or y position may be represented by a J-bit number consisting of H integer bits and K fractional bits. The positions can be represented in either signed or unsigned fixed point. For illustrative purposes, signed format will be assumed, but it will be appreciated that the techniques described could easily be adapted for a system using unsigned numbers.

Figure 7:
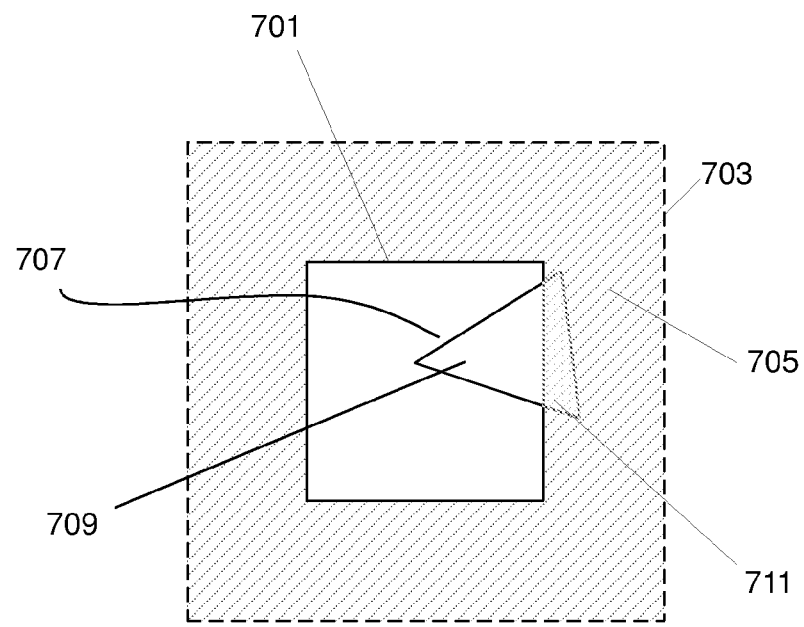
FIG. 7 shows a prior art example of a renderable image region surrounded by a guardband region used to reduce clipping costs.

In one example, J may be 16, with 12 integer and 4 fractional bits, allowing each x,y coordinate value to be anywhere in the range [−2048, 2047.9375]. Such an example would be suitable for rendering images of, say, 2k*2k pixels with a significant "off-screen" guardband region. FIG. 7 shows an example of a renderable image region surrounded by a guardband region used to reduce clipping costs. In FIG. 7, the renderable image region 701 is centred within the maximum range of vertex positions 703 i.e. the image pixels span coordinates [−1024, 1024]. The renderable image region 701 is surrounded by guardband region 705. Also shown in FIG. 7 is a polygon 707 having an on-screen portion 709 within the renderable image region 701 and an off-screen portion 711 In the guardband region 705.

For an edge extending between point P ($X_P$, $Y_P$) and the point Q ($X_Q$, $Y_Q$), the A, B and C coefficients, expressed in screen coordinates, may be represented as:

$$A_{PQ} = Y_P - Y_Q$$

$$B_{PQ} = X_Q - X_P$$

$$C_{PQ}^{SCREEN} = X_P Y_Q - X_Q Y_P$$

The A and B coefficients can each be exactly represented in J+1 bits. Although it may at first appear that the C coefficient will require 2J+1 bits, analysis of the range of results possible from signed J-bit coordinate values shows that 2J bits are sufficient. Allowing for the mapping of C from screen coordinates to tile-based coordinates, we obtain:

$$C_{PQ}^{TILE} = (X_P Y_Q - X_Q Y_P) + A_{PQ} \cdot T_X + B_{PQ} \cdot T_Y$$

where $T_X$ and $T_Y$ identify the corner of the tile.

This, in turn, may be shifted for the coarse grain evaluation to obtain:

$$C'_{PQ} = (X_P Y_Q - X_Q Y_P) + A_{PQ} \cdot (T_X - \{0,1\} \cdot t_x) + B_{PQ} \cdot (T_Y - \{0,1\} \cdot t_y)$$

Note that $T_x$, $T_y$, $t_x$ and $t_y$ are expressed in the fixed point range. Note that this expression may require additional bits of precision, and this depends on the relative sizes of the maximum supported image and the guardband sizes (see FIG. 7). It can be assumed that $C'_{PQ}$ requires L bits, where L≥2J.

Now consider the coarse grain evaluation expressions of the form $$By + C' \geq -Ax$$

as discussed in relation to the example of FIG. 6.

Each of the Ny, "B(4j)+C" expressions uses L bits to accurately represent them. However, each of the Nx, "−A.4i" expressions require considerably fewer bits to be accurately represented. In an example, the worst case (i.e. maximum number of required bits) is determined by −28A. This requires only M=J+1+3 bits. Note that the multiplier is a multiple of $t_x$, which in examples is of the form $2^T$. Therefore, the T least significant integer bits and the K fractional bits will all be zero. In examples, L is therefore significantly greater than M.

Figure 8:
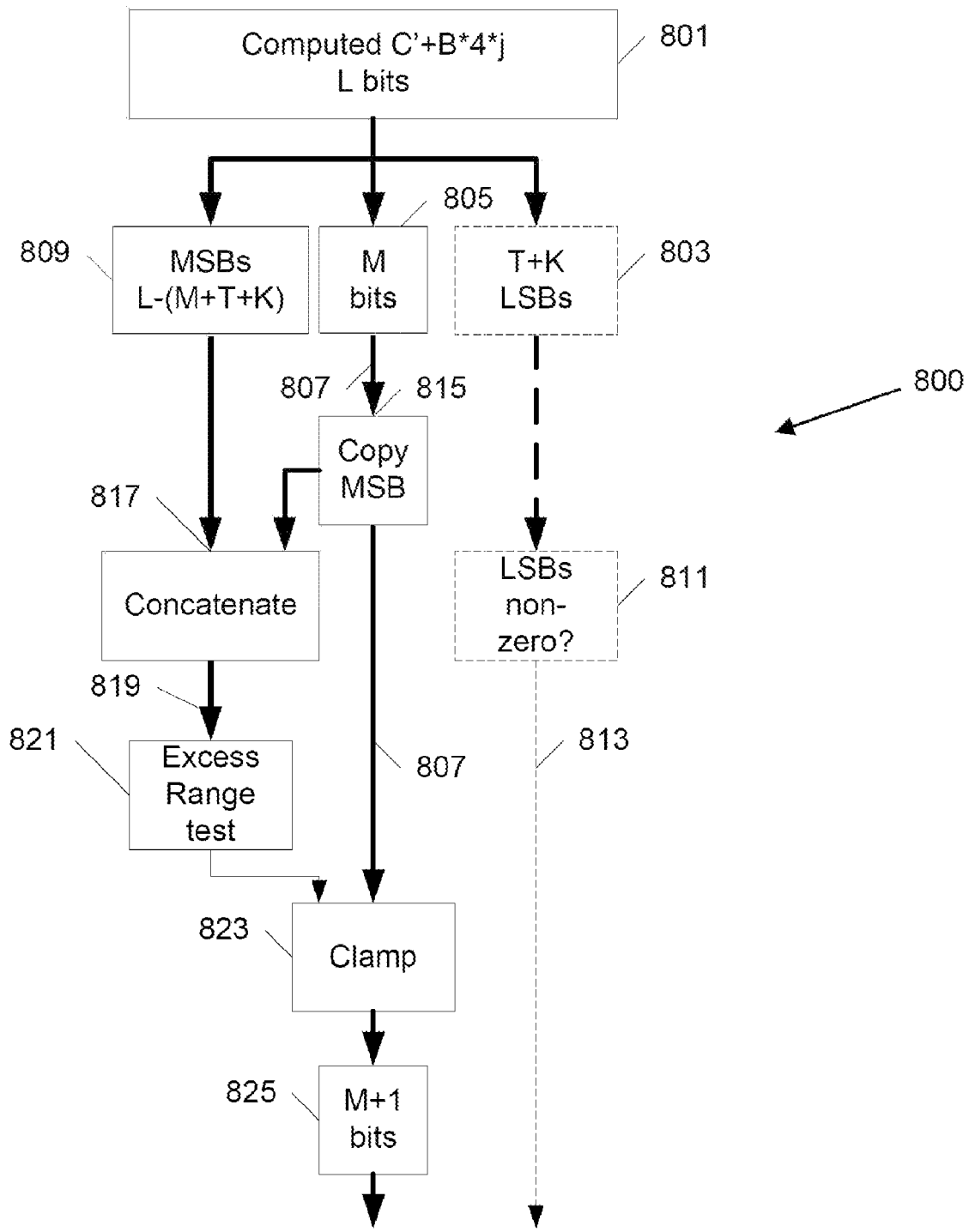
FIG. 8 shows an example of a clamping unit used to reduce each high precision By+C' expression to a smaller number of bits, in order to reduce the cost of subsequent comparators.

FIG. 8 shows an example of a clamping unit 800 to reduce the precision of a single B(4j)+C' value from L bits to M+1 bits, with the option of a further 1 bit flag output. The L-bit input value 801, is separated into three sets of contiguous bits: the T+K least significant bits (LSBs) 803, the next M more significant bits 805, to produce output value 807, and then the remaining most significant bits (MSBs), 809.

For cases where it is necessary to detect the special case By+C'=−Ax (e.g. for examples in which a more conservative coarse grain evaluation is used, i.e. where a sample point falling precisely on the edge cannot simply be considered as inside the edge), the least significant bits are tested at unit 811. Unit 811 tests to establish if any of the least significant bits are non-zero, and a Boolean flag 813 is then generated. Unit 811 is thus a T+K input OR gate. For examples of the coarse grain evaluation in which By+C'≥−Ax is used to define "inside" the edge, units 803 and 811 are not included.

The most significant bit of output value 807 is duplicated, 815, and concatenated, 817, as the least significant bit, with the output of 809, to form an L−(M+T+K)+1 -bit value, 819. The bits of value 819 are tested, at unit 821, to determine if the original value is outside the range of values representable by M bits, i.e. either <−$2^{M-1}$ or ≥$2^{M-1}$, and to indicate this to a clamp unit, 823. The test performed by unit 821 and the actions taken by clamp unit 823 are as follows:

a) When value 819 is not all 1's and the sign bit is set (i.e. the original fixed-point input value is <−$2^{M-1}$) then a value in the range [−$2^M$, −$2^{M-1}$−1] is output.
 b) When value 819 is not all 0's and the sign bit is not set (i.e. the original fixed-point input value is ≥$2^{M-1}$), then a value in the range [$2^{M-1}$, $2^M$−1] is output.

c) Otherwise (i.e. the original fixed point input value is in the range [$-2^{M-1}$, $2^{M-1}-1$]), value 807 is sign extended to M+1 bits and output at 825.

Thus, clamping unit 800 reduces the precision of a single B(4j)+C' value 801 from L bits to M+1 bits output at 825, and, optionally, a Boolean flag, 813.

In a first example, for case a) above, the value $-2^M$ is output, while for case b) above, the value $2^{M-1}$ is output. A second example slightly reduces the hardware costs: for case a) a (non constant) M+1 bit value is constructed with '10' as the top (most significant) two bits followed by the less significant M−1 bits of value 807; for case b) a M+1 bit value is constructed with '01' as the top (most significant) two bits followed, again, by the less significant M−1 bits of value 807. It will be appreciated that, for the output generated by clamp unit 823, the M−1 output bits are no longer a function of the test done by unit 821. Only the top two MSBs are ever changed according to cases a), b) and c) above.

Figure 9:
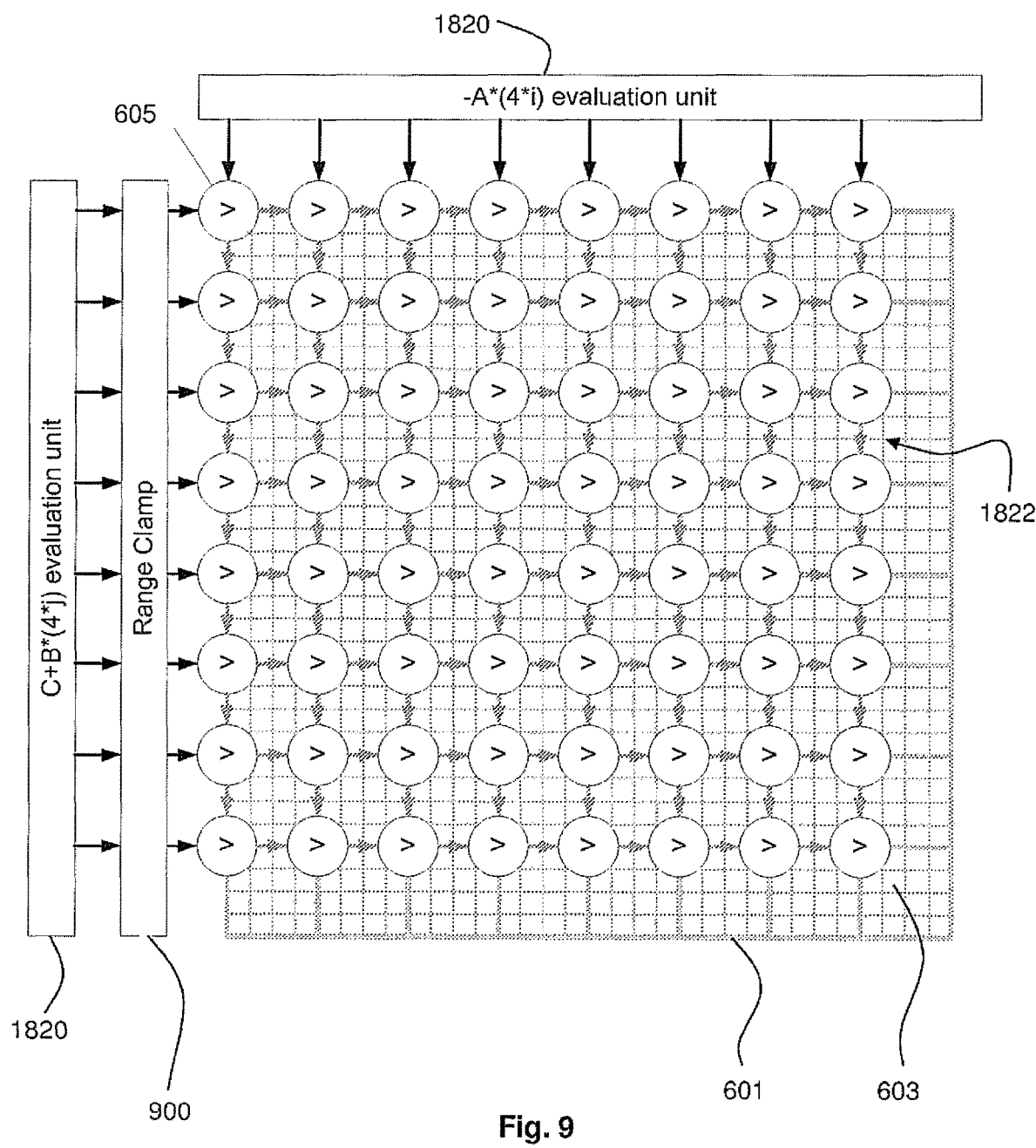
FIG. 9 shows a second example for determining which microtiles are inside a given edge, using an array of compare units and incorporating a clamping unit like that in FIG. 8.

FIG. 9 shows a second example for determining which microtiles are inside a given edge, using a comparison of By+C' and −Ax, but incorporating clamping units 800 like that in FIG. 8. FIG. 9 represents an improvement over the example of FIG. 6: by using the precision reduction logic of FIG. 8, the costs of a coarse grain evaluation can be reduced. As in FIG. 6, FIG. 9 illustrates this arrangement for an example with a 32*32 sample tile 601, 4*4 sample microtiles 603 and a grid of 8*8 comparators 605 to evaluate the inside test for an edge on all microtiles in parallel. FIG. 9 further includes clamping unit 900 containing Ny copies of the clamping unit 800 of FIG. 8. This clamps each of the Ny B(4j)+C' computed values to not exceed the maximum or minimum of an M+1 signed fixed-point number. By reducing the number of bits in the numbers to be compared, the clamping operation reduces the cost (in terms of complexity, silicon area and/or power consumption) of each of the comparators in the array 605.

As identified earlier, for cases where the expression By+C'≥−Ax is instead separated into By+C'>−Ax and By+C'=−Ax conditions, the Ny components of clamping unit 900 would each include units 803 and 811. The asserted 813 signal would then be tested in each of the comparators. As noted, the Ax values do not include the T+K LSBs because those bit values, in these examples, are implicitly zero. The presence of an asserted 813 signal, therefore, implies inequality.

An alternative example is able to make further savings taking advantage of the fact that the left half of the Nx "−A.4i"s are smaller still in magnitude, and so an additional clamping operation may be performed. Diminishing returns are achieved with further applications of this procedure, however. In a further example, C' is computed relative to the centre of the tile rather than the corner, allowing a further small reduction in the magnitudes of the various values.

Active Microtiles Within a Tile—Full or Iterative Evaluation

Figure 10:
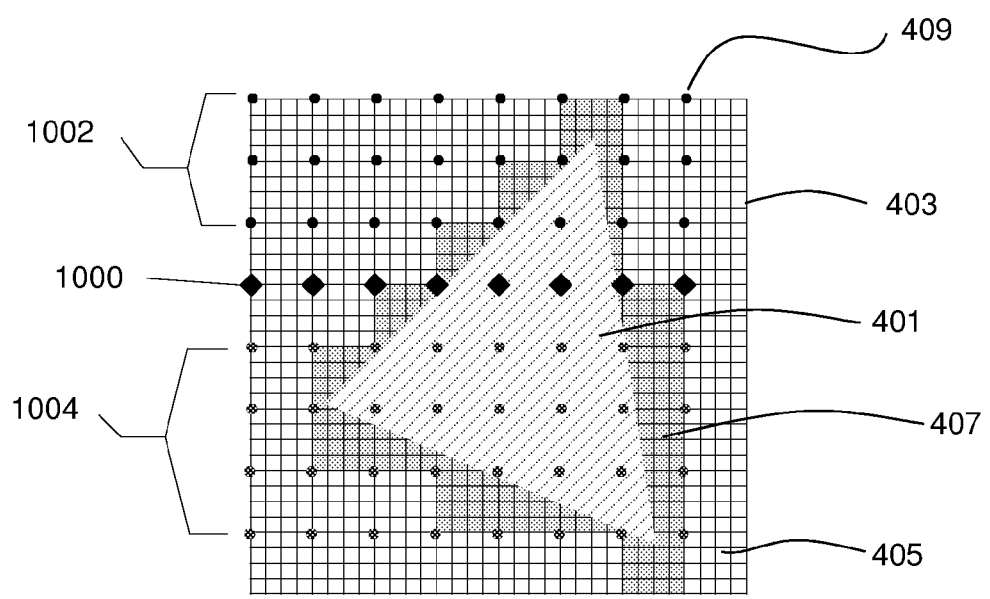
FIG. 10 shows full and iterative evaluation of intersected microtiles within a tile.

FIG. 10 shows full and iterative evaluation of intersected microtiles within a tile, for example using the array of comparators of FIG. 6 or FIG. 9. FIG. 10 is a modified version of FIG. 4. As in FIG. 4, FIG. 10 shows a triangular primitive 401 in a 32*32 sample tile 403 including 64 4*4 microtiles 405. The microtiles 407 which are intersected by primitive 401 are shaded in FIG. 10. Sample points 409 are provided at the top left hand corner of each microtile.

In a first example (full evaluation), the example depicted in FIGS. 4 and 10 accepts as inputs the A, B, and C coefficients for a set of edges and evaluates, for each edge, the eight "−Ax" terms against the eight "By+C'" terms. All sample locations 409 are thus evaluated for all edges in parallel. As noted earlier, for each edge, the entire 32*32 tile can be microtiled in a single clock with 8×8 comparators and 8+8 calculations (8 calculations to derive the 8 "−Ax" terms and 8 calculations to derive the 8 "By+C" terms).

In an alternative example of full evaluation, where the A, B and C edge coefficient sets arrive serially, a single design can be used to evaluate microtiles for each triangle edge in turn, in an subtractive manner. Discounting microtiles outside one current edge equation can be done for the entire tile in a single phase. At the end of the third edge, only the microtiles identified as contributing to the triangle will remain. The resulting map of up to 64 active microtiles can then be processed for detailed triangle edge and pixel depth evaluation.

In a second example (iterative evaluation) also illustrated in FIG. 10, rather than evaluating all sample locations in parallel, the example iterates in the y-direction between the maximum and minimum y extent of the object at microtile granularity. For each iteration, a "By+C'" value is calculated for the microtile row and eight "−Ax" values are generated. A row of microtiles can be evaluated with 8 comparators. One such row, indicated by the black sampling locations, is shown at 1000. The previously evaluated rows are shown at 1002, and the rows yet to be evaluated are shown at 1004.

In the example of a 32*32 tile with 4*4 microtiles, a single edge equation can be tested against the whole tile in a maximum of 8 clocks with each clock using 8+1 calculations (8 calculations to derive the 8 "−Ax" terms and 1 calculation to derive the "By+C" term) and 8 comparators. This is an inexpensive implementation which lends itself to replication e.g. three replications each working on its own edge equation in parallel. The output of each of the three evaluations are then logically AND-ed (+) to yield the final coverage result for the microtile row.

Identification of Active Minitiles

Figure 11:
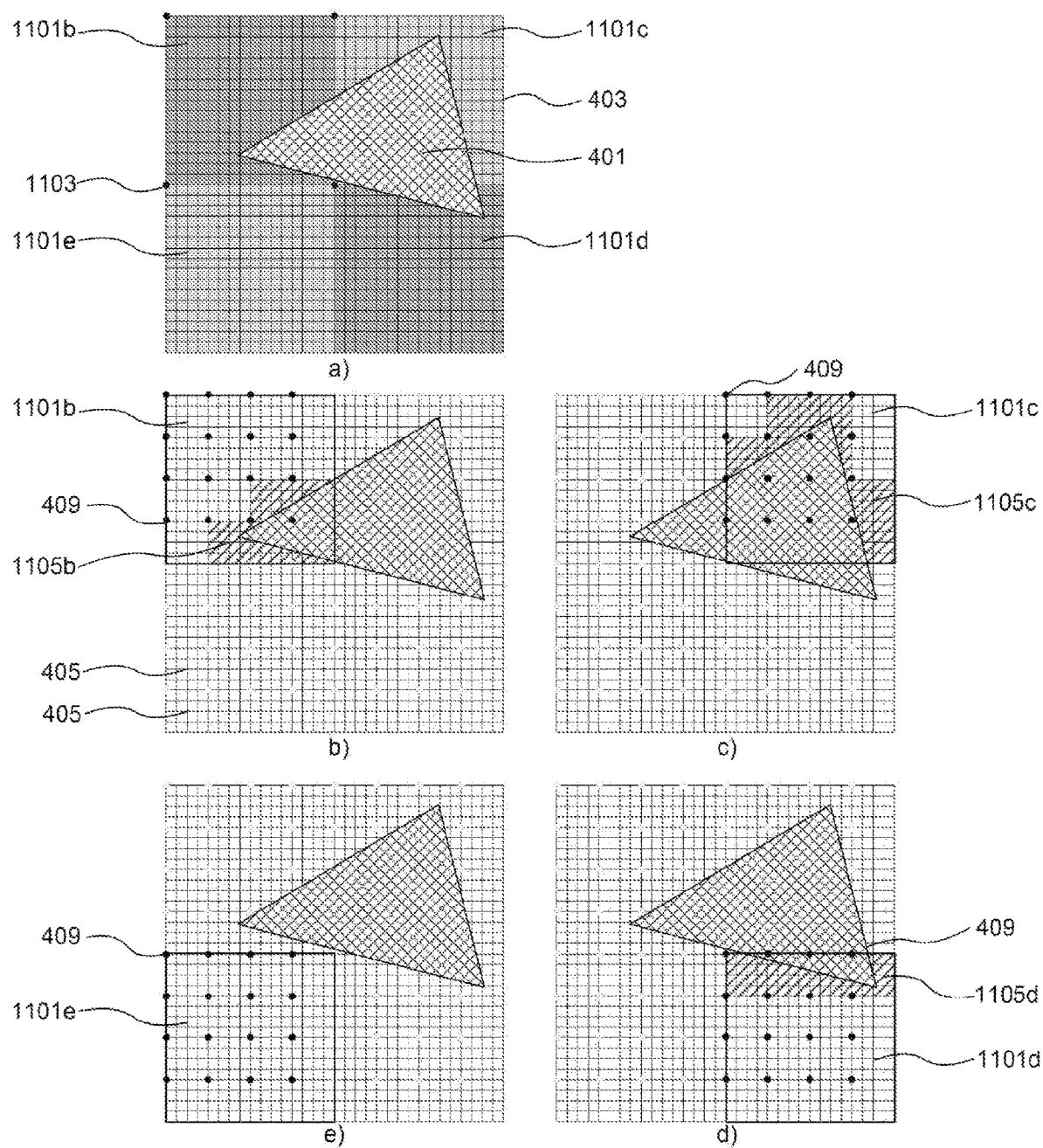
FIGS. 11a), b), c), d) and e) show an example which adds an additional level of hierarchy to the coarse grain evaluation.

FIGS. 11a), b), c), d) and e) depict a further example which adds an additional level of hierarchy to the coarse grain evaluation. FIG. 11a) is a modified version of FIG. 4. As in FIG. 4, FIG. 11a) shows a triangular primitive 401 in a 32*32 sample tile 403. However, each sample tile 403 is now divided into four intermediate rectangular areas (minitiles) 1101b, 1101c, 1101d and 1101e. Each minitile 1101b, 1101c, 1101d, 1101e is 16*16 pixels. Each minitile comprises 16 4*4 microtiles 405 (shown more clearly in FIGS. 11b) to e)). Thus, as in FIG. 4, each 32*32 sample tile 403 includes 64 4*4 microtiles 405.

An additional level of hierarchy is provided in the coarse grain evaluation. Before the active microtiles are identified, the active minitiles are identified. That is, the minitiles which are intersected by triangular primitive 401 are first identified. This is done using the same approach as already described in relation to microtiles, and sample points 1103 for each minitile 1101b, 1101c, 1101d, 1101e are provided at the top left hand corner of each minitile. In this example, the edge translations used in the calculations will be of minitile (half tile) x- and y-magnitude rather than microtile magnitude for the four sample points 1103. In this example, this is done using four "−Ax" calculations, four "−By+C" calculations and 4*4 comparators in a maximum of four phases.

In this example, three minitiles 1101b, c, and d, are active minitiles. Primitive 401 does not intersect minitile 1101e, which is therefore not active. Then, for each active minitile in turn, active microtiles within that minitile are identified, as already described, and this is shown in FIGS. 11b) to d).

Sample points 409 for identification of the active microtiles (in each minitile) are provided at the top left corner of each microtile.

FIG. 11b) shows the triangle 401 against the first active minitile 1101b. This is the minitile at the top left of tile 403. The microtiles 1105b in minitile 1101b which are intersected by the primitive 401 (the active microtiles) are shaded in FIG. 11b).

FIG. 11c) shows the triangle 401 against the second active minitile 1101c. This is the minitile at the top right of tile 403. The microtiles 1105c in minitile 1101c which are intersected by the primitive 401 (the active microtiles) are shaded in FIG. 11c).

FIG. 11d) shows the triangle 401 against the third active minitile 1101d. This is the minitile at the bottom right of tile 403. The microtiles 1105d in minitile 1101d which are intersected by the primitive 401 (the active microtiles) are shaded in FIG. 11d).

FIG. 11e) shows the triangle 401 against the inactive minitile 1101e. This is the minitile at the bottom left of tile 403. There are no active microtiles in minitile 1101e. There is no need to perform microtile calculations for a minitile that has been identified as inactive.

By identifying the active minitiles before identifying the active microtiles (i.e. by introducing an additional level of hierarchy into the coarse grain evaluation), efficiency can be improved even further.

Super-Sampling and Multi-Sample Anti-Aliasing

Figure 12:
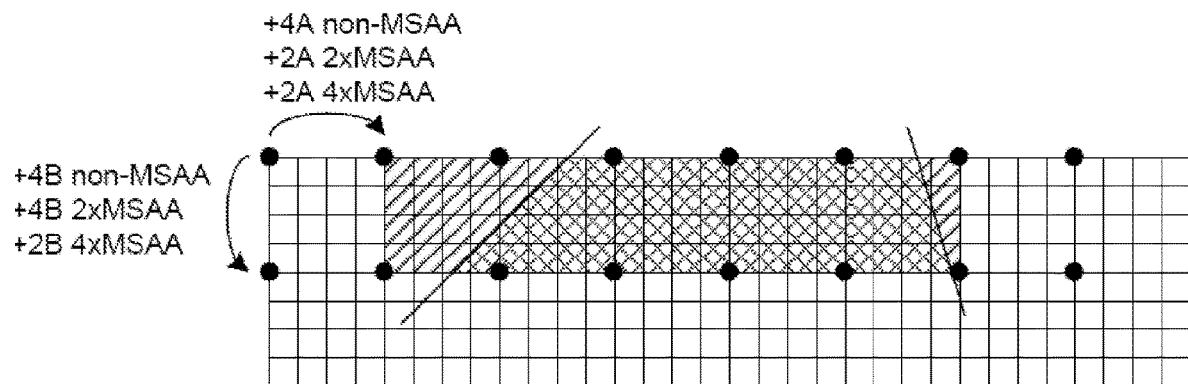
FIG. 12 shows how the microtiling calculations should be adjusted to include the application of multi sample anti-aliasing (MSAA) to the microtiling system.

In a system that supports various modes of super-sampling anti-aliasing (SSAA) or multi-sample anti-aliasing (MSAA), the microtiling calculations can be adjusted to suit the number of pixels between each point on the coarse sampling grid. FIG. 12 and Table 1 show the distance between microtile sample points for a system using a 4*4 sample microtile, for non-MSAA, 2×MSAA and 4×MSAA. In FIG. 12 and Table 1, 2×MSAA is horizontal sub-sample stacking i.e. additional resolution in the horizontal direction. 4×MSAA is additional resolution in both the horizontal and vertical directions. The principle readily extends to any size of microtile, but powers of two samples will be more efficient to implement.

TABLE 1

|  | Non-MSAA | 2×MSAA | 4×MSAA |
|---|---|---|---|
| Horizontal spacing | 4 samples = 4 pixels = 4A | 4 samples = 2 pixels = 2A | 4 samples = 2 pixels = 2A |
| Vertical spacing | 4 samples = 4 pixels = 4B | 4 samples = 4 pixels = 4B | 4 samples = 2 pixels = 2B |

Note in FIG. 12 that microtile sample point positions are separated by x and y integers. The anti-aliasing mode employed only affects the distance between sample points. Any sub-pixel grid offsets that need to be employed in fine grain pixel evaluations, such as the offsets shown in FIG. 2, do not need to be accounted for in the coarse grain evaluation (microtiling) phase.

Detailed Rasterization and Depth Processing

Identification of active microtiles in the coarse grain evaluation still leaves the processing of microtiles at pixel or sub-pixel resolution to be performed. The scan conversion of each microtile and the depth processing for each active pixel may be implemented with calculations that can be optimised given the presence of microtiles. Each triangular primitive may be defined by three edge equations (already discussed in detail) and a depth equation which allows depth processing to be performed, and each pixel to be shaded according to which primitives are visible in that pixel. By calculating the depth and edge equation terms for the top left sample point within a microtile and using this as a "base value", the remaining sample points (there are 15 remaining sample points in an exemplary 4*4 microtile) can be found with integer addition of A and B coefficients. An exemplary method is described below with reference to FIGS. 13, 14 and 15 for various sampling modes. The following equations incorporate sub-pixel grid offsets, dx and dy, which reflect the position of a sampling point within a pixel. For microtile evaluation, where the sampling point was at the top left corner of the microtile, no such offset was required. For edge processing a similar technique to that used in microtile evaluation may be employed, where "$-A.(x+dx)$" and "$B.(y+dy)+C$" terms are compared. For the depth calculation the actual depth value of $z(x,y)=A.(x+dx)+B.(y+dy)+C$ must be found.

Figure 13:
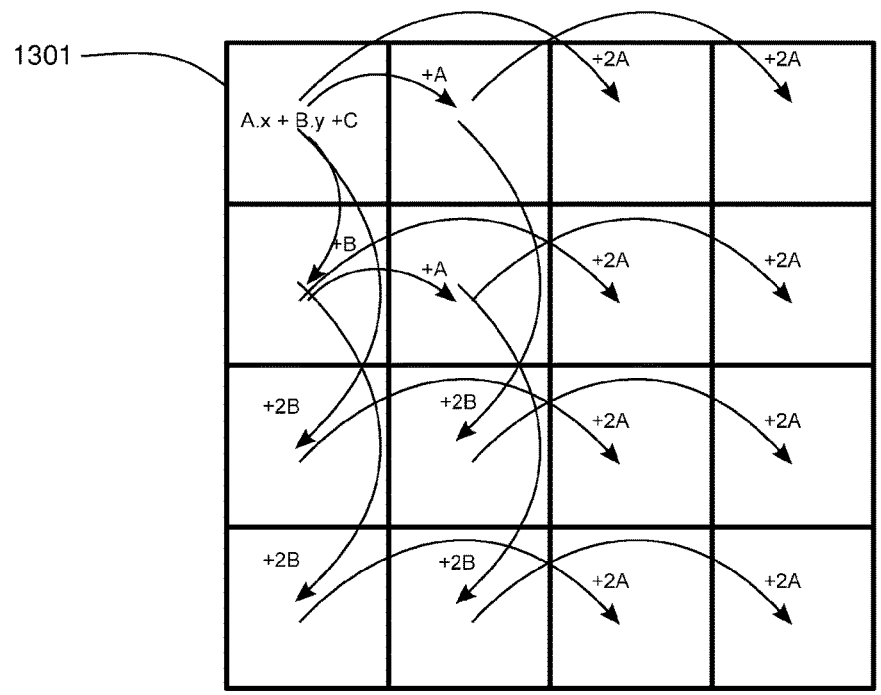
FIG. 13 shows how all sample positions may be calculated from the top left microtile when there is no multi sample anti-aliasing (non-MSAA)

FIG. 13 shows how all sample positions may be calculated from the top left microtile 1301 when there is no multi sample anti-aliasing (non-MSAA, Table 1, left hand column). The top left sample position is calculated. From this value, the top left 4 pixels can be found by adding A and/or B. The remaining 12 sample positions can be found from those top left 4 pixels by addition of a further 2A and/or 2B. Note that, although they are not illustrated, the initial Ax and By terms may include any sample grid offsets, dx, and dy.

Figure 14:
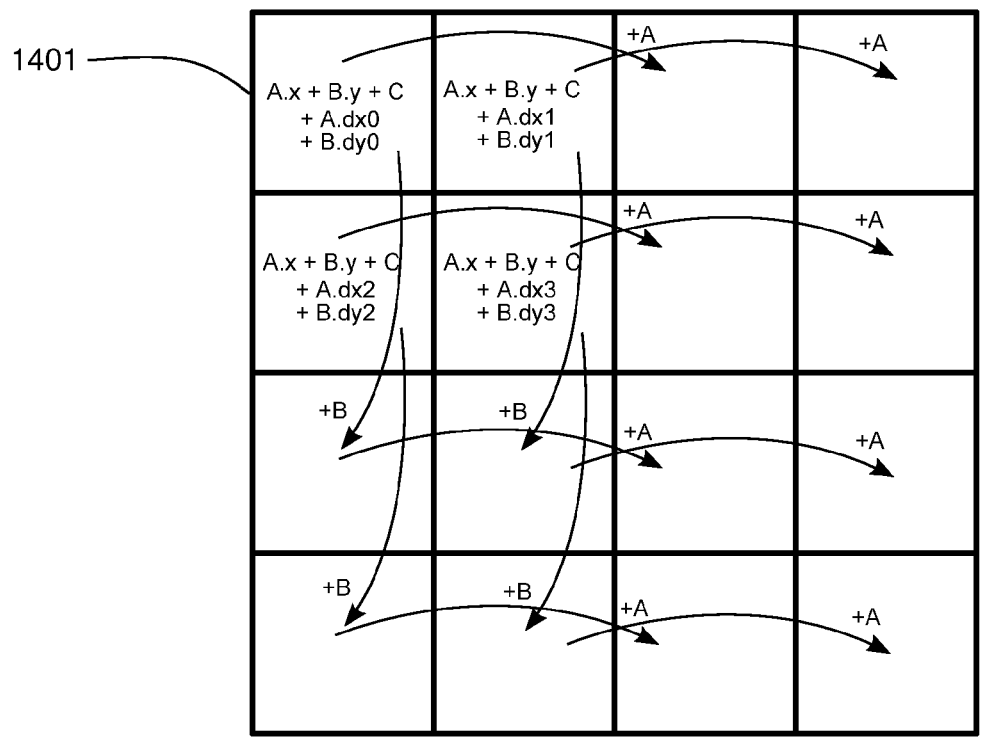
FIG. 14 shows how all sample positions may be calculated from the top left microtile when there is 4× multi sample anti-aliasing (4×MSAA)

FIG. 14 shows how all sample positions may be calculated from the top left microtile 1401 when there is 4× multi sample anti-aliasing (4× MSAA, Table 1, right hand column). Four samples in the top left of the microtile are calculated at their site-specific sample grid offset $dx_n$, $dy_n$ where n=0..3. The remaining 12 samples can be found with the addition of A and/or B only.

Figure 15:
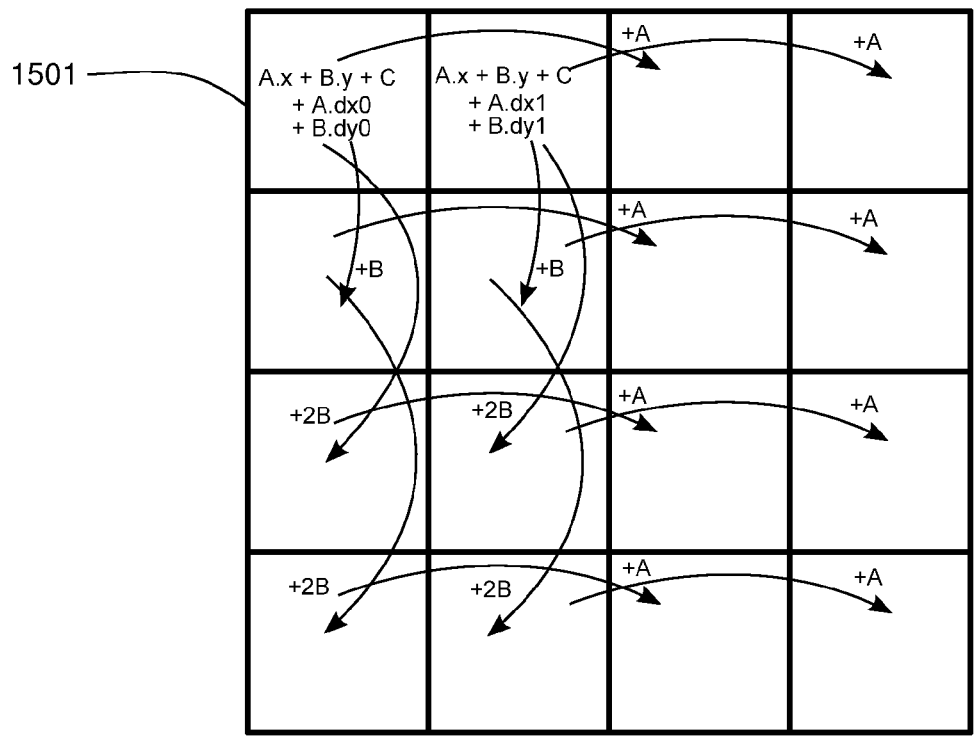
FIG. 15 shows how all sample positions may be calculated from the top left microtile when there is 2× multi sample anti-aliasing (2×MSAA)

FIG. 15 shows how all sample positions may be calculated from the top left microtile 1501 when there is 2× multi sample anti-aliasing (2× MSAA, Table 1, middle column). In the example shown in FIG. 15, and according to Table 1, there is increased resolution in the x-dimension (horizontal sub-sample stacking) requiring only +A to be added when traversing in the x-direction. The y-dimension requires a unit addition of B between any two contiguous samples vertically. It is, of course, equally valid to choose a scheme where the resolutions in the x- and y-directions are transposed, such that vertical sub-sample stacking is achieved. This would require A to be added between any two horizontally adjacent samples and B to be added at half the rate vertically. The choice of implementation of horizontal or vertical sub-sample stacking does not affect the principle behind the microtiling algorithm or adversely affect the cost of implementation.

What is claimed is:

1. A method of rendering in a graphics system, the method comprising:
    receiving data representing a set of polygons to be rendered;
    for each polygon in the set, determining whether that polygon intersects a sample point associated with a rectangular area by:
        deriving a plurality of edges from the polygon data,
        comparing each of the plurality of edges with a sample point to determine whether the sample point is located wholly outside any of the edges by:
            processing each of the plurality of edges to derive a plurality of processed edges, wherein the processing comprises, for each edge, determining an orientation of the respective edge and applying a translation to the respective edge in accordance with the orientation, and comparing each of the plurality of processed edges with the sample point, and if the sample point is not located wholly outside any of the edges, determining that the polygon intersects the sample point; and for each polygon which is determined to intersect the sample point, performing further processing of the polygon in the rectangular area.

2. The method according to claim 1, wherein the further processing comprises at least one of: scan conversion, depth testing, texturing, and shading.

3. The method according to claim 1, wherein each processed edge is represented by a respective edge equation and comparing each of the plurality of processed edges with the sample point comprises evaluating the respective edge equation at the sample point and determining whether the evaluation exceeds a predetermined threshold.

4. The method according to claim 1, wherein applying the translation to the respective edge in accordance with the orientation comprises: applying a translation to the respective edge in one dimension, applying a translation to the respective edge in two dimensions, or applying no translation to the respective edge.

5. The method according to claim 4, further comprising using the determination of whether the evaluation exceeds a predetermined threshold to determine whether the sample point is located inside or outside the processed edge.

6. The method according to claim 4, wherein each edge equation is of the form $E(x,y)=Ax+By+C$, where A, B and C are constants specific to the processed edge, and determining whether the evaluation exceeds a predetermined threshold comprises comparing $-Ax$ with $By+C$.

7. The method according to claim 6, further comprising outputting a first value if $By+C>-Ax$ and outputting a second value if $By+C<-Ax$, one of the first value and the second value indicating that the sample point is located inside the processed edge and the other of the first value and the second value indicating that the sample point is located outside the processed edge.

8. The method according to claim 6, wherein comparing $-Ax$ with $By+C$ for the processed edge comprises reducing the precision of "$By+C$" and comparing "$-Ax$" with the reduced precision "$By+C$".

9. A graphics system comprising a processing unit configured to:

receive data representing a tiled set of polygons to be rendered to determine, for each polygon in the set, whether that polygon intersects a sample point associated with a rectangular area by:

deriving a plurality of edges from the polygon data, and comparing each of the plurality of edges with the sample point to determine whether the sample point is located wholly outside any of the edges by:

processing each of the plurality of edges to derive a plurality of processed edges, wherein the processing comprises, for each edge, determining an orientation of the respective edge and applying a translation to the respective edge in accordance with the orientation, and comparing each of the plurality of processed edges with the sample point, and if the sample point is not located wholly outside any of the edges then the polygon is determined to intersect the sample point; and for each polygon which is determined to intersect the sample point, performing further processing of the polygon in the rectangular area.

10. The graphics system according to claim 9, wherein the further the further processing comprises at least one of: scan conversion, depth testing, texturing, and shading.

11. The graphics system according to claim 9, wherein each processed edge is represented by a respective edge equation and comparing each of the plurality of processed edges with the sample point comprises evaluating the respective edge equation at the sample point and determining whether the evaluation exceeds a predetermined threshold.

12. The graphics system according to claim 9, wherein the processing unit is configured to apply the translation to the respective edge in accordance with the orientation by: applying a translation to the respective edge in one dimension, applying a translation to the respective edge in two dimensions, or applying no translation to the respective edge.

13. The graphics system according to claim 9, wherein the processing unit is configured to use the determination of whether the evaluation exceeds a predetermined threshold to determine whether the sample point is located inside or outside the processed edge.

14. The graphics system according to claim 9, wherein each edge equation is of the form $E(x,y)=Ax+By+C$, where A, B and C are constants specific to the processed edge, and the processing unit is configured to determine whether the evaluation exceeds a predetermined threshold by comparing $-Ax$ with $By+C$.

15. The graphics system according to claim 14, wherein the processing unit is configured to output a first value if $By+C>-Ax$ and output a second value if $By+C<-Ax$, one of the first value and the second value indicating that the sample point is located inside the processed edge and the other of the first value and the second value indicating that the sample point is located outside the processed edge.

16. The graphics system according to claim 14, comprising a plurality of comparators for comparing $-Ax$ with $By+C$ for each processed edge for a plurality sample of points, each comparator associated with one sample point.

17. The graphics system according to claim 14, wherein comparing $-Ax$ with $By+C$ for the processed edge comprises reducing the precision of "$By+C$" and comparing "$-Ax$" with the reduced precision "$By+C$".

* * * * *